(12) United States Patent
Reddy

(10) Patent No.: US 10,264,109 B2
(45) Date of Patent: Apr. 16, 2019

(54) CONTACT SYNCHRONIZATION BETWEEN RELATED DEVICES OF A SUBSCRIBER ACCOUNT

(71) Applicant: T-Mobile USA, Inc., Bellevue, WA (US)

(72) Inventor: Ravikiran Reddy, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/017,855

(22) Filed: Jun. 25, 2018

(65) Prior Publication Data

US 2018/0302506 A1 Oct. 18, 2018

Related U.S. Application Data

(63) Continuation of application No. 15/291,802, filed on Oct. 12, 2016, now Pat. No. 10,021,230.

(51) Int. Cl.
| | |
|---|---|
| *H04M 1/27* | (2006.01) |
| *H04M 1/725* | (2006.01) |
| *H04M 1/2745* | (2006.01) |
| *H04M 3/42* | (2006.01) |

(52) U.S. Cl.
CPC ....... *H04M 1/27* (2013.01); *H04M 1/274516* (2013.01); *H04M 1/72561* (2013.01)

(58) Field of Classification Search
None
See application file for complete search history.

(56) References Cited

U.S. PATENT DOCUMENTS

| | | | | |
|---|---|---|---|---|
| 2012/0221962 A1* | 8/2012 | Lew | .................. | H04L 29/12896 715/752 |
| 2014/0066044 A1* | 3/2014 | Ramnani | ................. | H04W 8/24 455/418 |
| 2018/0103137 A1 | 4/2018 | Reddy | | |

OTHER PUBLICATIONS

Office Action for U.S. Appl. No. 15/291,802, dated Oct. 12, 2017, Reddy, "Contact Synchronization Between Related Devices of a Subscriber Account", 26 pages.
Office action for U.S. Appl. No. 15/291,802. dated Jun. 7, 2017, Reedy, "Contact Synchronization Between Related Devices", 25 pages.

* cited by examiner

*Primary Examiner* — Idowu O Osifade
(74) *Attorney, Agent, or Firm* — Lee & Hayes, P.C.

(57) ABSTRACT

Synchronization between related devices is described. A group of related devices includes devices that are associated with the same subscriber account, share the same cellular telephone line, and so forth. In an example, a related device that is a browser-enabled device may register with a service that enables the browser-enabled device to share a same account and/or same line with other related device(s). Based partly on the browser-enabled device registering with the service, the browser-enabled device may retrieve data associated with contacts (i.e., contact data) that is associated with at least one other related device that is a cellular communication device. Additionally, a user associated with the browser-enabled device and/or a user associated with the at least one other related device may make modifications to the contact data and techniques described herein may enable synchronization of such modifications between the related devices.

20 Claims, 9 Drawing Sheets

600

```
┌─────────────────────────────────────────────────────────┐
│ RECEIVE AN INDICATION OF A REGISTRATION OF A BROWSER-ENABLED │
│ DEVICE WITH A NETWORK TO UTILIZE A COMMUNICATION ADDRESS FOR │
│   SENDING AND RECEIVING COMMUNICATIONS VIA THE NETWORK  │
│                          602                            │
└─────────────────────────────────────────────────────────┘
                           ↓
┌─────────────────────────────────────────────────────────┐
│  RETRIEVE CONTACT DATA FROM AT LEAST ONE DEVICE THAT IS RELATED │
│              TO THE BROWSER-ENABLED DEVICE              │
│                          604                            │
└─────────────────────────────────────────────────────────┘
                           ↓
┌─────────────────────────────────────────────────────────┐
│              STORE THE CONTACT DATA IN A DATABASE       │
│                          606                            │
└─────────────────────────────────────────────────────────┘
                           ↓
┌─────────────────────────────────────────────────────────┐
│      PROVIDE THE CONTACT DATA TO THE BROWSER-ENABLED DEVICE │
│                          608                            │
└─────────────────────────────────────────────────────────┘
```

FIG. 6

CONTACT SYNCHRONIZATION BETWEEN RELATED DEVICES OF A SUBSCRIBER ACCOUNT

CROSS REFERENCE TO RELATED APPLICATIONS

This is a continuation application which claims priority to commonly assigned, co-pending U.S. patent application Ser. No. 15/291,802, filed Oct. 12, 2016. Application Ser. No. 15/291,802 is fully incorporated herein by reference.

BACKGROUND

Users have multiple telecommunication devices such as cellular phones, tablet computers, laptops, and other devices. Each device may have its own communication address, such as a telephone number, and may receive communications directed to any communication address associated with a service account.

In IP Multimedia Subsystem (IMS), call forking may be achieved through implicit registration sets (IRS). With IRS, when any one network identity (e.g., IP Multimedia Public Identifier (IMPU)) associated with a communication address is registered, other network identities associated with a same service account as that network identity are also registered. When a communication is received and directed to any one network identity of the registration set, it may be sent to all network identities of that registration set.

Session Initiation Protocol (SIP), as extended by RFC 3265 ("Session Initiation Protocol (SIP)-Specific Event Notification," June 2002), utilizes a subscribe method to request a current state as well as state updates from a remote node. The specification for Open Mobile Alliance (OMA) Presence SIMPLE (SIP for Instant Messaging and Presence Leveraging Extensions) defines mechanisms for utilizing SIP to perform instant messaging and other functions. Rich Communication Services (RCS) is a GSM Association (GSMA) program that provides for inter-operability within an IP Multimedia Subsystem (IMS). One feature of RCS is the ability to discover capabilities of contacts. RCS utilizes OMA Presence SIMPLE for various features, including subscription to a presence server to obtain capability information for a list of contacts.

Generally, telecommunication devices are associated with data stores that store information, such as communication addresses, associated with other telecommunication devices (e.g., contacts). When a user of a telecommunication device desires to communicate with another telecommunication device, the user may select which telecommunication device (e.g., contact) of the other telecommunication devices he or she desires to send a communication, and a cellular network or other network may facilitate sending the communication to the intended telecommunication device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 6 illustrates an example process for synchronizing contacts between related devices.

DETAILED DESCRIPTION

Figure 1:
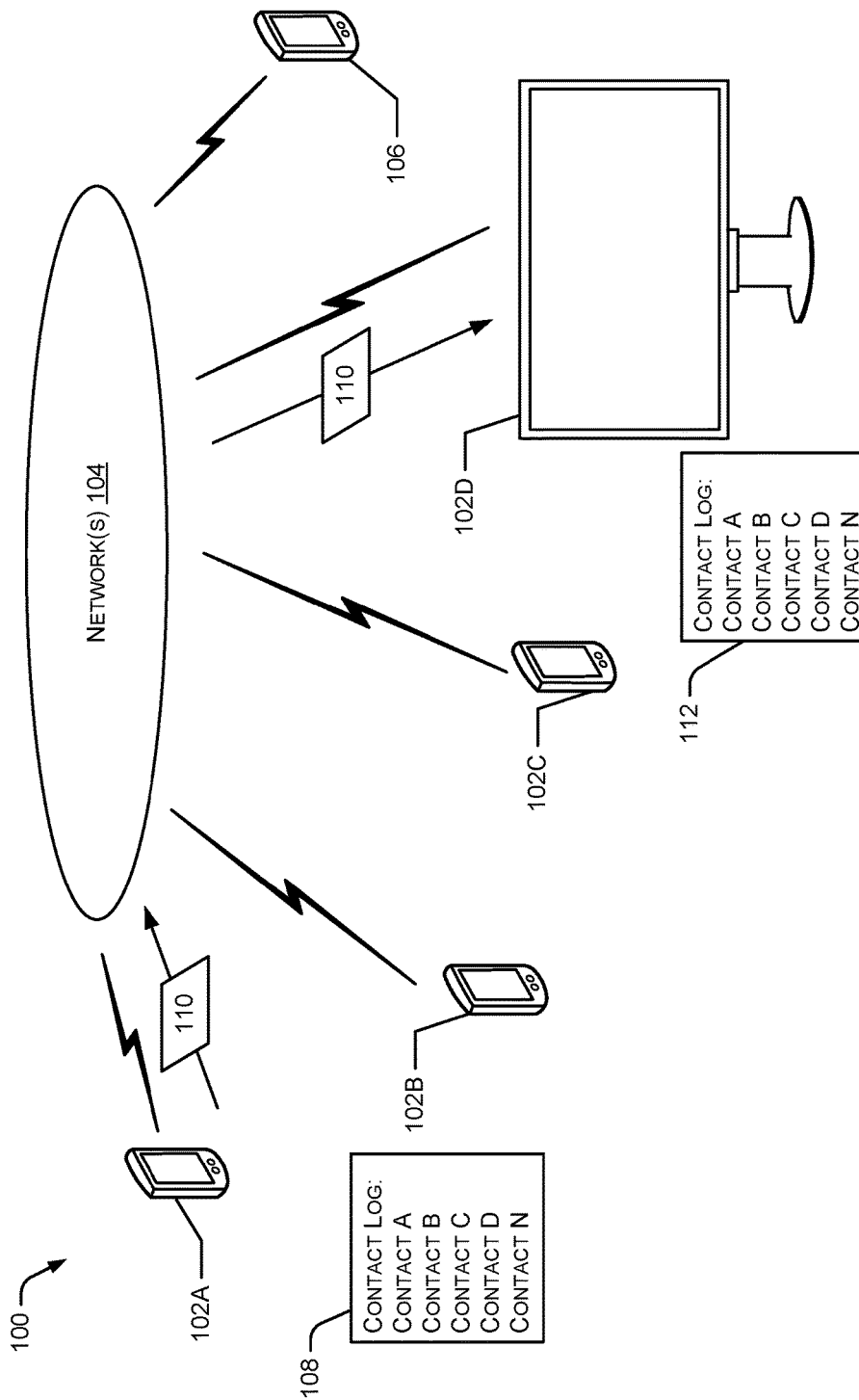
FIG. 1 illustrates an environment for synchronizing contacts between related devices.

In examples of the present disclosure, synchronization between related devices is described. A group of related devices includes devices that are associated with the same subscriber account, share the same cellular telephone line, and so forth. Devices sharing the same subscriber account are often associated with an international mobile subscriber identity (IMSI). Devices sharing the same telephone line are configured to send, receive, and initiate, cellular communications using a shared identifier, communications address, and so forth, such as a telephone number, MSISDN (sometimes referred to as the "Mobile Station International Subscriber Directory Number"), IP Multimedia Public Identifiers (IMPU), and so forth. Thus, devices are related in some examples based on their being associated with the same "account" (e.g., associated with an IMSI), associated with the same "line" (e.g., associated with the same communication address), and so forth. That is, for the purpose of this discussion, devices that are associated with a same account and/or a same line may be referred to as related devices. In some examples, related devices may include devices for which incoming calls (e.g., voice calls, video calls, etc.) and messages (e.g., Short Message Service (SMS) messages, Multimedia Messaging Service (MMS) messages, etc.) sent to the common communication address may be sent to all of the related devices.

In at least one example, a related device may be any type of device. For instance, in some examples, a related device may be a browser-enabled device (e.g., a laptop computer, a desktop computer, a tablet computer, etc.). That is, in at least one example, a related device may utilize a communication service that is available via a browser. In other examples, a related device may be a cellular communication device (e.g., a mobile phone, etc.) that may utilize a communication service provided by a cellular communication network. In at least one example, the browser-enabled device may not be able to access contact information that is associated with the cellular communication device. Additionally or alternatively, the browser-enabled device may not be able to save new contact information or delete contact information that is associated with the cellular communication device. Techniques described herein enable synchronization of contacts between related devices regardless of whether the related devices are browser-enabled devices or cellular communication devices.

As described herein, a related device that is a browser-enabled device may register with a service that enables the browser-enabled device to share a same account and/or same line with one or more other related devices. That is, a browser-enabled device may send or receive communications associated with a common communication address via a browser. Based at least in part on the browser-enabled device registering with the service, server(s) may enable the browser-enabled device to access data associated with one or more contacts that is associated with at least one other related device. For the purpose of this discussion, data associated with one or more contacts may be referred to as contact data. Contact data may be stored on the related device or in a remote storage (e.g., cloud server) that is accessible by the related device. In at least one example, a user associated with the browser-enabled device may make modifications to the contact data and techniques described herein may enable synchronization of such modifications for the one or more other related devices. Similarly, a user associated with a related device of the one or more related devices may make modifications to the contact data and techniques described herein may enable synchronization of such modifications for the browser-enabled device.

Various examples of the present disclosure are described below in reference to the figures.

FIG. 1 illustrates an environment 100 for facilitating synchronizing contacts between related devices. In environment 100, device 102A, device 102B, device 102C, and device 102D are examples of related devices. As described above, one or more of the related devices may be cellular communication devices (e.g., device 102A, device 102B, and/or device 102C) and one or more of the related devices may be browser-enabled devices (e.g., device 102D). While four related devices are shown, any number of devices may be related so long as they share at least one of a line or an account with another device. The related devices (e.g., device 102A, device 102B, device 102C, and device 102D) are each communicatively coupled to network(s) 104. As described herein, network(s) 104 may include a cellular network, the Internet, and/or another network.

In at least one example, presence information for the related devices (e.g., device 102A, device 102B, device 102C, and device 102D) may be obtained from a presence server associated with the network(s) 104, such as a SIP server or other. Presence information obtained from the presence server—such as Internet Protocol (IP) addresses or other network address information—may be utilized to establish a connection amongst related devices (e.g., device 102A, device 102B, device 102C, and/or device 102D) to synchronize contacts between related devices (e.g., device 102A, device 102B, device 102C, and/or device 102D). Presence information obtained from the presence server may be utilized to identify related devices (e.g., device 102A, device 102B, device 102C, and device 102D). Presence information obtained from the presence server may be utilized to identify those related devices (e.g., device 102A, device 102B, device 102C, and/or device 102D) that are currently online and/or are capable of receiving communications directed to the related devices (e.g., device 102A, device 102B, device 102C, and/or device 102D), content that is shared between the related devices (e.g., device 102A, device 102B, device 102C, and/or device 102D), and/or instructions for synchronizing contacts between related devices (e.g., device 102A, device 102B, device 102C, and/or device 102D).

The presence server may also be utilized to establish communications sessions between related devices (e.g., device 102A, device 102B, device 102C, and/or device 102D). In at least one example, a sharing policy for sharing contact data may be enforced, such as a sharing policy that allows contact data to be shared amongst related devices (e.g., device 102A, device 102B, device 102C, and/or device 102D), and prevents the contact information from being shared with devices that do not share a line and/or an account with the related devices (e.g., device 102A, device 102B, device 102C, and/or device 102D). For the purpose of this discussion, devices that do not share a line and/or an account with one or more related devices may be referred to as external devices. In environment 100, device 106 is an example of an external device.

In environment 100, a contact log 108 associated with device 102A is shown. A contact log 108 may correspond to contact data that is stored locally in a database associated with a related device (e.g., device 102A) of the related devices (e.g., device 102A, device 102B, device 102C, and/or device 102D) and/or stored remotely in a remote storage that is accessible by the related device (e.g., device 102A). The contact log 108 may include data items corresponding to one or more contacts. That is, each contact may be associated with at least one data item. The at least one data item may include a communication address for communicating with a device associated with the contact. In some examples, a contact may be associated with additional data items corresponding to other information associated with the contact (e.g., physical address, e-mail address, demographic information, etc.). In at least one example, related devices (e.g., device 102A, device 102B, and/or device 102C) may provide contact data 110 to server(s) associated with the network(s) 104.

In at least one example, a browser-enabled device (e.g., device 102D) may register, via a browser, with a communication service that enables the browser-enabled device (e.g., device 102D) to utilize a same account and/or same line as the one or more other related devices (e.g., device 102A, device 102B, and/or device 102C) to send and receive communications. In such examples, based at least in part on the browser-enabled device (e.g., device 102D) registering with the communication service, the network(s) 104 may enable the browser-enabled device (e.g., device 102D) to retrieve contact data 110 associated with the one or more other related devices (e.g., device 102A, device 102B, and/or device 102C) from the server(s) associated with the network(s) 104. Based at least in part on retrieving the contact data 110, the browser-enabled device (e.g., device 102D) may store the contact data 110 locally in a database associated with the browser-enabled device (e.g., device 102D). That is, based at least in part on retrieving the contact data 110 from the server(s) associated with the network(s) 104, the browser-enabled device (e.g., device 102D) may generate its own contact log 112.

In some examples, the contact log 112 associated with the browser-enabled device (e.g., device 102D) may include the same contact data 110 as the contact log(s) associated with the one or more other related devices (e.g., device 102A, device 102B, and/or device 102C). However, in alternative examples, a sharing policy may cause the contact log 112 associated with the browser-enabled device (e.g., device 102D) to include contact data 110 that is different from the contact log(s) associated with the one or more other related devices (e.g., device 102A, device 102B, and/or device 102C). That is, in at least one example, a sharing policy may exclude some contacts from the contact log 112 associated with the browser-enabled device (e.g., device 102D).

As described herein, based at least in part on synchronizing contacts between related devices (e.g., device 102A, device 102B, device 102C, and/or device 102D), one or more of the related devices (e.g., device 102A, device 102B, device 102C, and/or device 102D) may modify the contact data 110 and techniques described herein may facilitate synchronizing modifications with each of the related devices (e.g., device 102A, device 102B, device 102C, and/or device 102D). That is, techniques described herein may facilitate the synchronization of contact logs (e.g., contact log 108 and contact log 112) based on modifications to contact data 110 by one or more of the related devices (e.g., device 102A, device 102B, device 102C, and/or device 102D).

Figure 2:
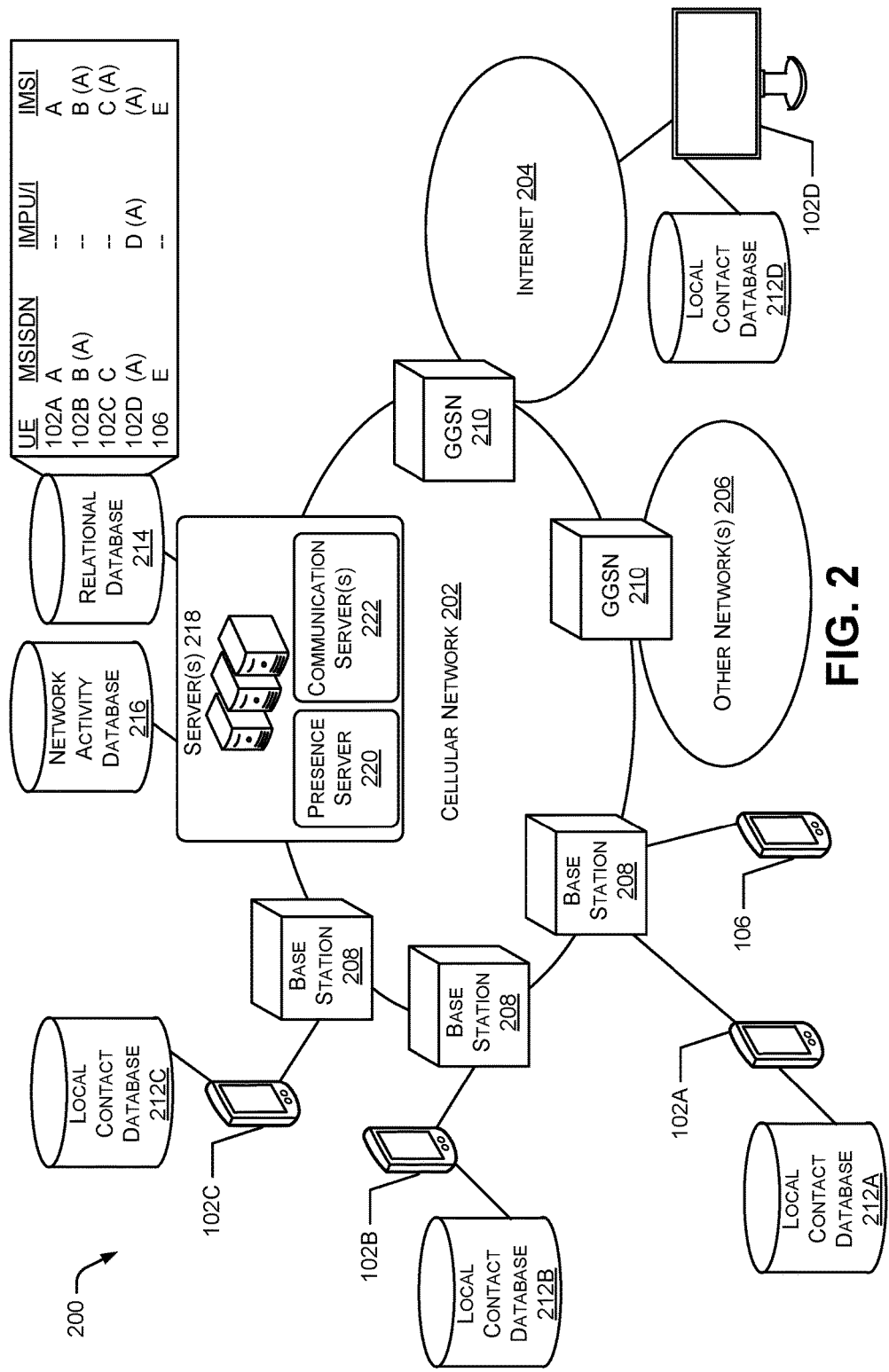
FIG. 2 illustrates additional details of an environment for synchronizing contacts between related devices.

FIG. 2 illustrates additional details of an environment 200 for synchronizing contacts between related devices as described above with reference to FIG. 1.

In at least one example, a related device (e.g., device 102A) communicates with an external device (e.g., device 106) and one or more related devices (e.g., device 102B, device 102C, and/or device 102D) via a cellular network 202, the Internet 204, and/or one or more other networks 206. The cellular network 202, the Internet 204, and/or the one or more other networks 206 may correspond to network(s) 104 with reference to FIG. 1. In at least one example, device 102A, device 102B, device 102C, and/or device 106 may connect to the cellular network 202 via a corresponding base station 208. Some related devices (e.g., device 102D) may not be capable of connecting through a base station 208 of the cellular network 202. However, such related devices (e.g., device 102D) may register with the cellular network 202 through the Internet 204. The cellular network 202 may be responsible for routing voice communication to other networks 206, as well as routing data communication to external packet switched networks, such as the Internet 204. For example, the cellular network 202 may include a Gateway GPRS Support Node (GGSN) 210 or another equivalent node.

Each of the related devices (e.g., device 102A, device 102B, device 102C, and/or device 102D) and the external device 106 may correspond to user equipment (UE). The UE may include, but is not limited to, one or more of a smart phone, a personal digital assistant, a netbook, a laptop computer, a smart appliance, and/or another electronic device that is capable of sending or receiving voice, video, and/or data via the cellular network 202, the Internet 204, and/or one or more other network(s) 206 (e.g., a Wi-Fi network, another access network, etc.).

In an example where a UE is a cellular communication device (e.g., a mobile phone), the cellular communication device may include a subscriber identity module (SIM) card 118, which has an international mobile subscriber identity (IMSI) stored thereon. An IMSI is a unique 64-bit number. Within a GSM network, the IMSI is associated with the MSISDN, sometimes referred to as the "Mobile Station International Subscriber Directory Number," or more commonly as the telephone number. The MSISDN is a unique number that identifies a subscription on a GSM network and is also the number that may be used to place a call to the GSM phone. The MSISDN is not necessarily stored on the SIM card 118 or the cellular communication device, and the MSISDN is not permanently associated with the IMSI. The MSISDN may change if the subscription changes, for example.

In some examples, multiple UEs are registered with a common number (e.g., MSISDN, IMPU, IMPI, etc.) ("line," as used herein) and/or are associated with a common subscriber account (e.g., IMSI) ("account," as used herein), and thus are "related devices," as used herein. For example, individual of the related devices that are cellular communication devices (e.g., device 102A, device 102B, and/or device 102C) may have their own unique IMSI programmed into their respective SIM cards, which are associated with a specific telephone number (MSISDN) and which may also be unique to each related device (e.g., device 102A, device 102B, and/or device 102C). But the IMSI and MSISDN pair may be associated in the network with "alias numbers" to allow for shared lines and/or shared accounts, thereby making them related devices.

As described above, some related devices, such as related devices that are browser-enabled devices (e.g., device 102D), may not be capable of connecting through a base station 208 of the cellular network 202. However, such related devices (e.g., device 102D) may register with the cellular network 202 through the Internet 204 using a unique identifier, such as an IMPI or IMPU, a globally routable user agent URI (GRUU), or other. In at least one example, these identifiers may take the form of a telephone number (e.g., they may resemble a MSISDN). In at least one example, such related devices (e.g., device 102D) may utilize a browser (e.g., web browser) to register with the cellular network 202 and facilitate communications. In such examples, the cellular network 202 may forward calls and messages to such related devices (e.g., device 102D), and such related devices (e.g., device 102D) may be enabled to send or receive calls and messages in a same or similar way as with other related devices (e.g., device 102A, device 102B, and/or device 102C).

In at least one example, each of the related devices (e.g., device 102A, device 102B, device 102C, and device 102D) may be associated with a local contact database (e.g., local contact database 214A, local contact database 214B, local contact database 214C, and local contact database 214D, respectively). As described above, the local contact database(s) (e.g., local contact database 214A, local contact database 214B, local contact database 214C, and local contact database 214D) may be associated with database(s) that store contact data on each of the related devices (e.g., device 102A, device 102B, device 102C, and device 102D) and/or that store contact data remotely (e.g., cloud server). Local contact database 214A and local contact database 214D may respectively correspond to contact log 108 and contact log 112, described above with reference to FIG. 1. That is, in at least one example, a local contact database (e.g., local contact database 214A, local contact database 214B, local contact database 214C, and/or local contact database 214D) may store contact data. As described above, one or more data items may be mapped to, or otherwise associated with, individual contacts in the local contact database (e.g., local contact database 214A, local contact database 214B, local contact database 214C, and/or local contact database 214D). In at least one example, data items that are mapped to, or otherwise associated with, a contact may include a communication address, physical address, e-mail address, demographic information, etc.

In at least one example, line and/or account associations for related devices (e.g., device 102A, device 102B, device 102C, and/or device 102D) may be stored in a relational database 214. Non-limiting examples of the IMSI and MSISDN associations for related devices (e.g., device 102A, device 102B, device 102C, and/or device 102D) are depicted in relational database 214. For instance, device 102A is associated with IMSI A and MSISDN A. Device 102B is associated with IMSI B and MSISDN B, but also with alias MSISDN A and alias IMSI A. Thus, device 102B is associated both with the same account and with the same line as device 102A. Device 102C is associated with IMSI C and MSISDN C, but also with alias IMSI A. Thus, device 102C shares an account (IMSI A) but not a telephone line with device 102A. As illustrated in relational database 214 in FIG. 2, device 102D is associated with IMPU D and also with alias IMPU A. Device 102D therefore shares a telephone line with device 102A and device 102B and an account with device 102A, device 102B, and device 102C.

In addition to the relational database 214, the cellular network 202 may be associated with a network activity database 216. The network activity database 216 may include data corresponding to communication events associated with the confined grouping of related devices (e.g., device 102A, device 102B, device 102C, and/or device 102D). For instance, the network activity database 216 may include entries corresponding to calls (e.g., voice calls, video calls, etc.), messages (e.g., SMS messages, MMS messages, etc.), etc. Additionally, the network activity database 216 may store contact data. One or more data items may be mapped to, or otherwise associated with, each contact in the network activity database 216. As described above, data items associated with a contact may include a communication address, physical address, e-mail address, demographic information, etc.

The relational database 214 and the network activity database 216 may be associated with server(s) 218. In various embodiments, each of the server(s) 218 may be any type of server, such as a network-accessible server. In various examples, each of the server(s) 218 may be associated with one or more processor(s) and computer-readable media, which may execute one or more modules and/or processes to cause the server(s) 218 to perform a variety of functions, as set forth above and explained in further detail in the following disclosure.

In at least one example, the server(s) 218 may include a presence server 220 and one or more communication servers 222. The presence server 220 may retrieve data that corresponds to the MSISDN, IMSI, IMPU/IMPI, etc. of the related devices (e.g., device 102A, device 102B, device 102C, and/or device 102D) from the relational database 214. The data may include information specifying the associated device number (e.g., a MSISDN, IMSI, IMPU/IMPI, or the like) for which the related devices (e.g., device 102A, device 102B, device 102C, and/or device 102D) are able to utilize for initiating, sending, and/or receiving communications. Thus, the presence information provided to a related device (e.g., device 102A) regarding one or more of the other related devices (e.g., device 102B, device 102C, and/or device 102D), which may indicate the shared line or account (e.g., may indicate whether and how the devices are related devices), may enable the related device (e.g., device 102A) to recognize that the other related devices (e.g., device 102B, device 102C, and/or device 102D) are related devices that share the same account and/or line as the related device (e.g., device 102A), as well as to distinguish devices that are not related devices (such as device 106). In some examples, the related device (e.g., device 102A) may request from the presence server 220 a list of related devices (e.g., device 102B, device 102C, and/or device 102D).

In at least one example, a related device (e.g., device 102A) may be configured to obtain presence information for one or more contacts, including the related devices (e.g., device 102B, device 102C, and/or device 102D), from the presence server 220. The presence server 220 may be a SIP server, and the related device (e.g., device 102A) may be configured to utilize OMA Presence SIMPLE to obtain presence information regarding one or more contacts, including the related devices (e.g., device 102B, device 102C, and/or device 102D). In some examples, a related device (e.g., device 102A) may utilize presence information to determine which contacts correspond to related devices.

A related device (e.g., device 102A) may utilize the presence information—including for example an IP address or other information—to establish a connection with the related devices (e.g., device 102B, device 102C, and/or device 102D). In some examples, presence information obtained from the presence server 220 may be utilized to identify those related devices (e.g., device 102A, device 102B, device 102C, and/or device 102D) that are currently online.

In some examples, the related devices (e.g., device 102A, device 102B, device 102C, and/or device 102D) may be configured to provide their presence information to the presence server 220. Additionally and/or alternatively, the related devices (e.g., device 102A, device 102B, device 102C, and/or device 102D) may be configured to provide capabilities information to the presence server 220. The capabilities information may indicate an ability to receive calls, receive messages, receive shared content, receive shared video conversations, receive data for synchronizing contacts, and so forth. In other examples, the related devices (e.g., device 102A, device 102B, device 102C, and/or device 102D) may obtain each other's presence information and/or capabilities information in other ways, such as through static configuration, peer-to-peer connections, and so forth.

The communication server(s) 222 may facilitate sending and receiving communications. In at least one example, the communication server(s) 222 include a telephony application server that may be used for voice, message, and video communications via the cellular network 202, Internet 204, and/or other network(s) 206.

Figure 3:
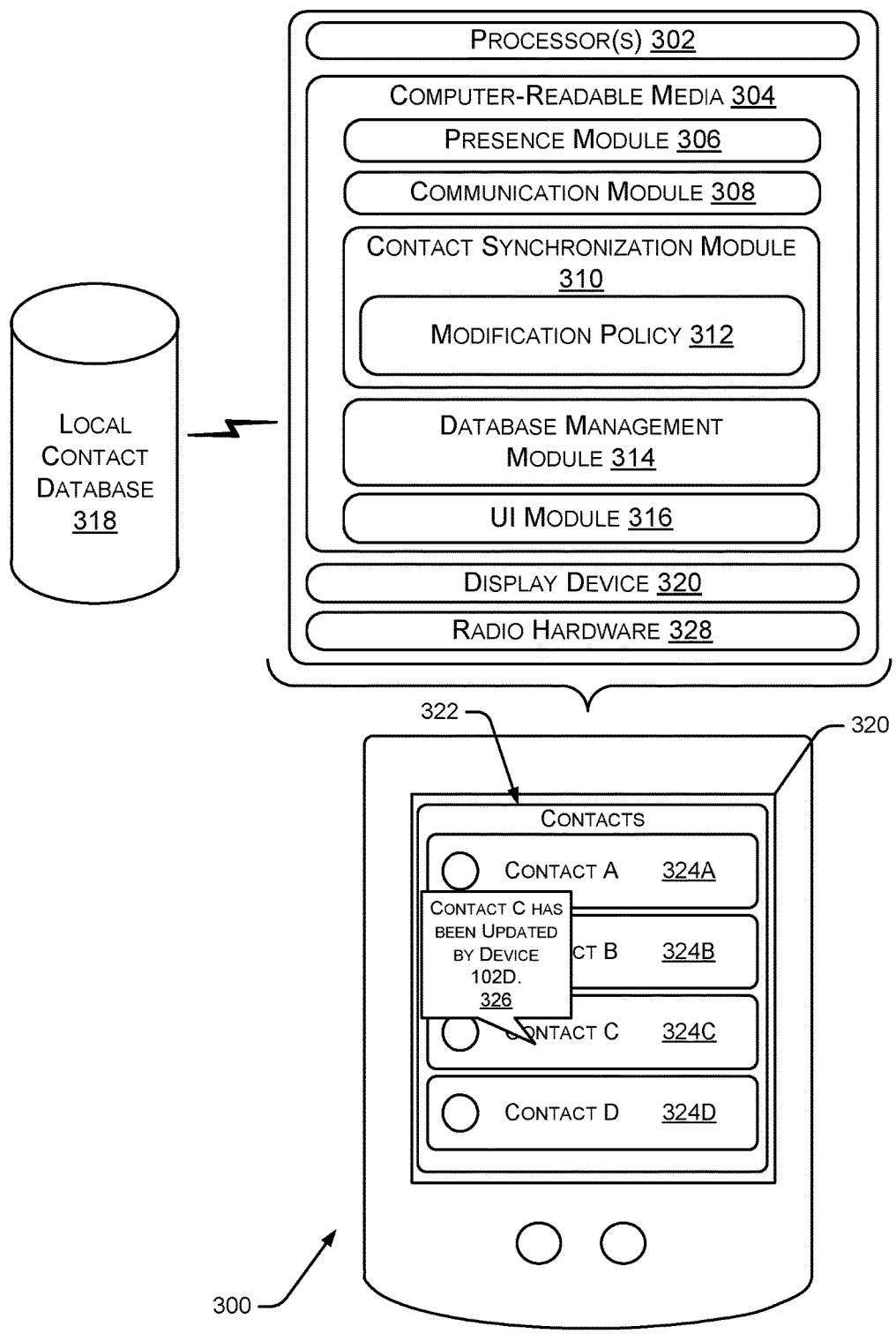
FIG. 3 illustrates an example cellular communication device configured to enable synchronizing contacts between related devices.

FIG. 3 illustrates an example cellular communication device 300 configured to enable synchronizing contacts between related devices. Cellular communication device 300 may correspond to any one of the related devices (e.g., device 102A, device 102B, and/or device 102C). In at least one example, cellular communication device 300 may connect to a cellular network 202 via a corresponding base station 208. While cellular communication device 300 may connect to a cellular network 202 via a corresponding base station 208, cellular communication device 300 may also be associated with various technologies (e.g., operating system, application software, Wi-Fi, Bluetooth, NFC, GPS, etc.) such that cellular communication device 300 may also be a mobile computing device. For the purpose of this discussion, cellular communication device 300 corresponds to device 102A. As illustrated in FIG. 3, the cellular communication device 300 includes processor(s) 302 and computer-readable media 304.

Processor(s) 302 may represent, for example, a CPU-type processing unit, a GPU-type processing unit, a Field-Programmable Gate Array (FPGA), another class of Digital Signal Processor (DSP), or other hardware logic components that may, in some instances, be driven by a CPU. For example, and without limitation, illustrative types of hardware logic components that may be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator may represent a hybrid device, such as one from ZYLEX or ALTERA that includes a CPU course embedded in an FPGA fabric. In various embodiments, the processor(s) 302 may execute one or more modules and/or processes to cause the cellular communication device 300 to perform a variety of functions, as set forth above and explained in further detail in the following disclosure. Additionally, each of the processor(s) 302 may possess its own local memory, which also may store program modules, program data, and/or one or more operating systems.

Depending on the exact configuration and type of the cellular communication device 300, the computer-readable media 304, may include computer storage media and/or communication media.

Computer storage media may include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that may be used to store and maintain information for access by a computing device.

In at least one example, the computer storage media may include non-transitory computer-readable media. Non-transitory computer-readable media may include volatile and nonvolatile, removable and non-removable tangible, physical media implemented in technology for storage of information, such as computer readable instructions, data structures, program modules, or other data. Computer-readable media 304 is an example of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which may be used to store the desired information and which may be accessed by the cellular communication device 300. Any such non-transitory computer-readable media may be part of the cellular communication device 300.

In contrast, communication media includes computer readable instructions, data structures, program modules, or other data in a modulated data signal, such as a carrier wave, or other transmission mechanism. As defined herein, computer storage media does not include communication media.

The computer-readable media 304 may include one or more modules and data structures including, for example, a presence module 306, a communication module 308, a contact synchronization module 310, including a modification policy 312, a database management module 314, and a user interface (UI) module 316. The one or more modules and data structures may be in the form of stand-alone applications, productivity applications, an operating system component, or any other application or software module having data items that facilitate interactions between related devices (e.g., device 102A, device 102B, device 102C, and/or device 102D), external device(s) (e.g., device 106), the server(s) 218, and/or one or more networks (e.g., cellular network 202, Internet 204, other network(s) 206, etc.), as described herein.

The presence module 306 may be configured to retrieve presence information associated with one or more related devices (e.g., device 102A, device 102B, device 102C, and/or device 102D). As described above, presence information obtained from the presence server 220 may be utilized to identify related devices (e.g., device 102A, device 102B, device 102C, and device 102D). The presence module 306 may be configured to retrieve the presence information from the presence server 220, such as via OMA Presence SIMPLE protocol, or in some other fashion, as described above. In at least one example, the presence module 306 may provide presence information to the presence server 220. Additionally and/or alternatively, presence module 306 may be configured to provide capabilities information, described above, to the presence server 220.

The communication module 308 may facilitate communications between the cellular communication device 300 and one or more other related devices (e.g., device 102B, device 102C, and device 102D) and/or an external device 106. For instance, the communication module 308 may facilitate sending calls, messages, etc. to one or more other related devices (e.g., device 102B, device 102C, and device 102D) and/or an external device 106 and/or receiving calls, messages, etc. from one or more other related devices (e.g., device 102B, device 102C, and device 102D) and/or an external device 106.

The contact synchronization module 310 may access contact data that is stored in a local contact base 318 and may provide contact data to the server(s) 218. The local contact database 318 may correspond to a local contact database (e.g., local contact database 212A), as described above with reference to FIG. 2. For instance, local contact database 318 may store contact data. In at least one example, one or more data items may be mapped to, or otherwise associated with, individual contacts. As described above, data items that are mapped to, or otherwise associated with, a contact may include a communication address, physical address, e-mail address, demographic information, etc. In some examples, the local contact database 318 may be integral to the cellular communication device 300. In other examples, the local contact database 318 may be communicatively coupled to the cellular communication device 300.

In at least one example, a browser-enabled related device (e.g., device 102D) may be activated such that the browser-enabled related device (e.g., device 102D) registers with a cellular network (e.g., the cellular network 202). In at least one example, the contact synchronization module 310 may receive an indication that a browser-enabled related device (e.g., device 102D) registered with the cellular network (e.g., the cellular network 202). Based at least in part on receiving the indication, the contact synchronization module 310 may provide contact data to the server(s) 218. In at least one example, the indication may be associated with a request for contact data from the server(s) 218. In such an example, the contact synchronization module 310 may send contact data to the server(s) 218 in response to the request. In other examples, the contact synchronization module 310 may provide contact data to the server(s) 218 without first receiving a request.

In at least one example, contact data that is stored in the local contact database 318 may be modified. For instance, a user associated with the cellular communication device 300 may add a new contact and may therefore cause one or more new data items to be mapped to, or otherwise associated with, the new contact in the local contact database 318. Additionally and/or alternatively, a user associated with the cellular communication device 300 may delete a contact and may therefore cause all of the data items mapped to, or otherwise associated with, the contact that has been deleted to be deleted. Moreover, in some examples, a user associated with the cellular communication device 300 may cause data associated with a particular contact of the one or more contacts to be updated. For instance, a user associated with the cellular communication device 300 may cause a new data item to be mapped to, or otherwise associated with, the particular contact or cause a data item that is mapped to, or otherwise associated with, the particular contact to be updated or deleted.

In at least one example, the contact synchronization module 310 may provide an indication to the server(s) 218 indicating that contact data has been modified. In some examples, the indication may include instructions to map, or otherwise associate, one or more new data items to a new contact to be added to the contact data that is stored in the network activity database 216. Additionally and/or alternatively, the indication may include instructions to delete one or more data items corresponding to a contact that has been deleted. Moreover, in at least one example, the indication may include instructions to update one or more data items associated with a contact to which at least some of the contact data that is stored in the network activity database 216 corresponds.

In at least one example, the contact synchronization module 310 may provide an indication to the server(s) 218 indicating that contact data has been modified responsive to the modification. That is, a modification to contact data may cause the contact synchronization module 310 to send an indication associated with the modification to the server(s) 218. In alternative examples, the contact synchronization module 310 may send contact data to the server(s) 218 at a particular frequency (e.g., every hour, every day, etc.), after a lapse in a period of time (e.g., 30 minutes, 60 minutes, etc.), etc. and any modifications to the contact data may be reflected in the content data sent to the server(s) 218.

In at least one example, the contact synchronization module 310 may receive instructions associated with a modification to contact data. That is, the contact synchronization module 310 may receive instructions from the server(s) 218 indicating that another one of the related devices (e.g., device 102B, device 102C, and/or device 102D) modified the contact data and specifying the modification(s). Based at least in part on receiving the instructions, the contact synchronization module 310 may cause the contact data stored in the local contact database 318 to be updated to reflect the modification.

In at least one example, a cellular communication device 300 may determine a modification policy 312. The modification policy 312 may correspond to a policy that identifies other related devices (e.g., device 102B, device 102C, and/or device 102D) that are permitted to modify contact data. In at least one example, the modification policy 312 may identify which of the related devices (e.g., device 102B, device 102C, and/or device 102D) are permitted to modify contact data and particular modifications (e.g., add a new contact, delete a contact, update a contact, etc.) that are permitted by each of the related devices (e.g., device 102B, device 102C, and/or device 102D) that are permitted to modify the contact data.

In at least one example, the modification policy 312 may indicate that all of the related devices (e.g., device 102B, device 102C, and/or device 102D) are permitted to modify content data. In some examples, the modification policy 312 may indicate that all of the related devices that are cellular communication devices (e.g., device 102B and device 102C) may modify contact data and that a related device that is a browser-enabled related device (e.g., device 102D) is not permitted to modify contact data. Alternatively, the modification policy 312 may indicate that all of the related devices that are cellular communication devices (e.g., device 102B and device 102C) may perform any modifications (e.g., add a new contact, delete a contact, update a contact, etc.) to contact data and that a related device that is a browser-enabled related device (e.g., device 102D) is permitted to perform some modifications, but not all modifications. For instance, as a non-limiting example, a browser-enabled related device (e.g., device 102D) may be permitted to modify contact data by updating a data item associated with a contact or adding a data item mapped to, or otherwise associated with, a contact, but may not be able to delete data item(s) mapped to, or otherwise associated with, a contact. Moreover, in at least one example, the modification policy 312 may indicate that some—but not all—of the related devices that are cellular communication devices (e.g., device 102B and device 102C) may modify contact data. That is, in some examples, the modification policy 312 may indicate which of the related devices that are cellular communication devices (e.g., device 102B and device 102C) may modify contact data and which modifications the related devices are permitted to perform. The contact synchronization module 310 may provide the modification policy 312 to the server(s) 218 to enable the server(s) 218 to manage modifications of contact data.

The database management module 314 may manage the local contact database 318. In at least one example, the database management module 314 may define the local contact database 318, create the local contact database 318, receive and/or determine data stored in the local contact database 318, analyze data stored in the local contact database 318, manage data stored in the local contact database 318, update data stored in the local contact database 318, and otherwise administer the local contact database 318. In at least one example, the database management module 314 may modify contact data that is stored in the local contact database 318. That is, based at least in part on receiving an indication that another related device (e.g., device 102B, device 102C, and/or device 102D) added a new contact, deleted a contact, updated a contact, etc., the database management module 314 may update contact data in the local contact database 318 by causing one or more new data items to be mapped to, or otherwise associated with, a new contact, removing data items mapped to, or otherwise associated with, a contact that has been deleted, and/or updating one or more data items mapped to, or otherwise associated with, a contact.

The UI module 316 may be configured to cause a presentation of a graphical representation of at least some of the data in the local contact database 318 via a display device 320 associated with the cellular communication device 300. In at least one example, the UI module 316 may generate a graphical user interface 322 that may be presented via the display device 320. Graphical user interface 322 is a non-limiting example of a graphical user interface presenting a plurality of contacts. Each contact is associated with a user interface element (e.g., Contact A is associated with user interface element 324A, Contact B is associated with user interface element 324B, Contact C is associated with user interface element 324C, Contact D is associated with user interface element 324D).

In at least one example, the graphical user interface 322 may be interactive such to enable a user associated with the cellular communication device 300 to select a contact to access additional and/or alternative information than what is presented on the graphical user interface 322. That is, in at least one example, the user interface elements (e.g., user interface element 324A, user interface element 324B, user interface element 324C, and user interface element 324D) may be associated with a control, hyperlink, overlay, etc., which may be actuated to present additional and/or alternative information via the graphical user interface 302. Additionally and/or alternatively, a user associated with the cellular communication device 300 may select a user interface element (e.g., user interface element 324A, user interface element 324B, user interface element 324C, or user interface element 324D) corresponding to a contact to initiate a communication that is directed to that contact. That is, in at least one example, the user interface elements (e.g., user interface element 324A, user interface element 324B, user interface element 324C, and user interface element 324D) may be associated with a control, hyperlink, overlay, etc., which may be actuated to initiate a call, send a message, etc. to a device associated with the selected contact.

As described herein, in at least one example, one or more of the other related devices (e.g., device 102B, device 102C, and/or device 102D) may modify the contact data. In such examples, the UI module 316 may cause a notification to be presented via the graphical user interface 322 that may be used to notify a user that a modification has occurred and, in some examples, which contact has been modified. A non-limiting example of a notification 326 is shown in association with user interface element 324C (i.e., Contact C). In alternative examples, a symbol, an animation, or some other mechanism may be used to notify a user that a modification has occurred and, in some examples, which contact has been modified. In some examples, the notification 326 or other mechanism may identify which of the related devices (e.g., device 102B, device 102C, and/or device 102D) modified the contact data, modification(s) associated with the contact data, etc.

Radio hardware 328 provides wireless UE capabilities, such as connecting to a cellular network base station, a Wi-Fi network, or other wireless networks. The radio hardware 328 may include or be incorporated into processors, application-specific integrated circuits (ASICs), programmable circuits such as field programmable gate arrays (FPGAs), or in other ways. The software modules stored on the computer-readable media 304 are configured to access hardware via interrupts, calling APIs, and the like. The software modules may also be configured to pass information to one another, such as through APIs, by storing commands, parameters, etc. in a predetermined memory location, etc. Other examples are possible without departing from the scope of this disclosure.

Figure 4:
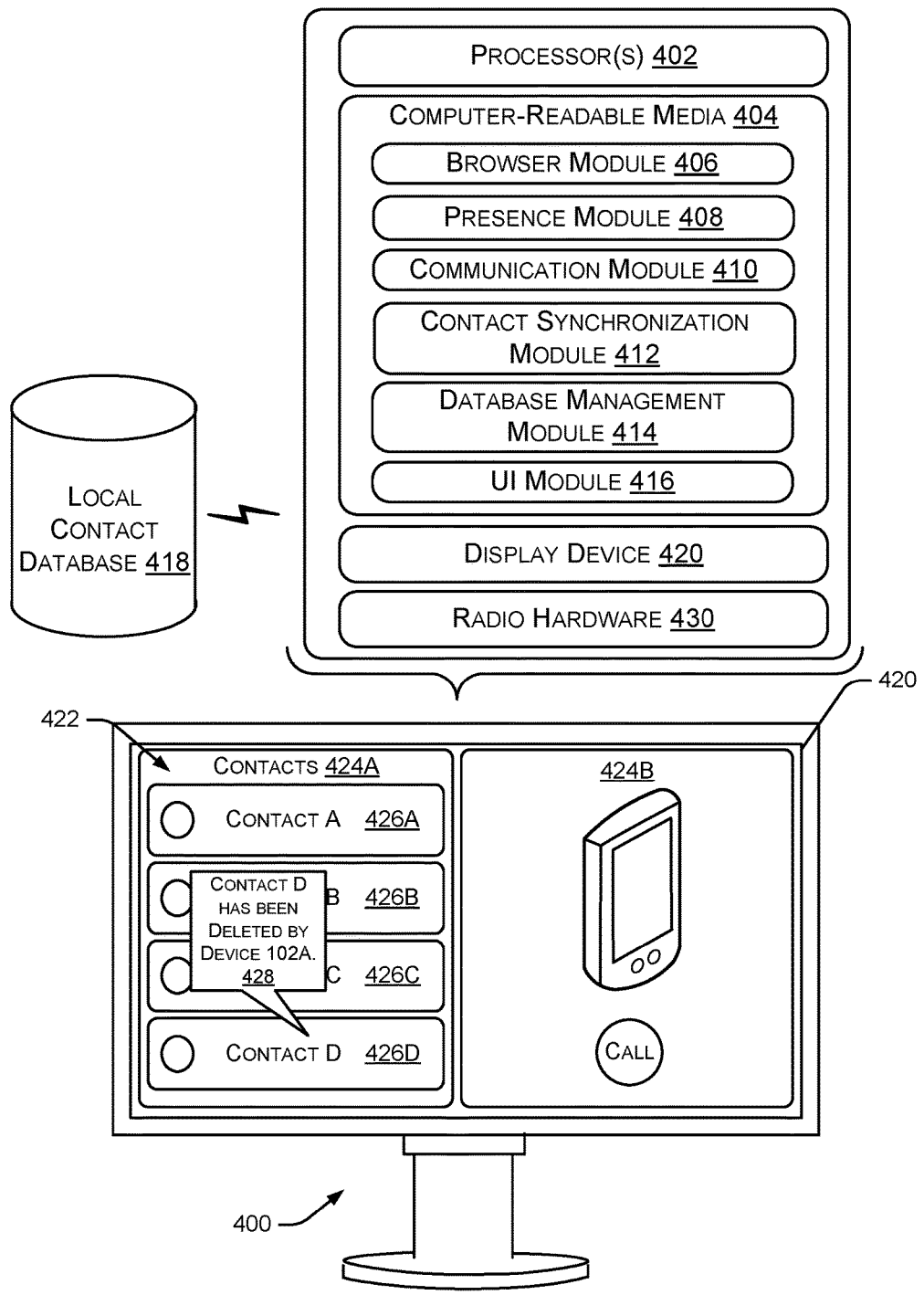
FIG. 4 illustrates an example browser-enabled device configured to enable synchronizing contacts between related devices.

FIG. 4 illustrates an example browser-enabled device 400 configured to enable synchronizing contacts between related devices. For the purpose of this discussion, browser-enabled device 400 may correspond to device 102D. As illustrated in FIG. 4, the browser-enabled device 400 includes processor(s) 402 and computer-readable media 404. Processor(s) 402 may have the same structure and perform the same function(s) as processor(s) 302, described above with reference to FIG. 3. Computer-readable media 404 may have the same structure and perform the same function(s) as computer-readable media 304 described above with reference to FIG. 3.

In at least one example, the computer-readable media 404 may include one or more modules and data structures including, for example, a browser module 406, a presence module 408, a communication module 410, a contact synchronization module 412, a database management module 414, and a user interface (UI) module 416. The one or more modules and data structures may be in the form of stand-alone applications, productivity applications, an operating system component, or any other application or software module having data items that facilitate interactions between related devices (e.g., device 102A, device 102B, device 102C, and/or device 102D), external device(s) (e.g., device 106), the server(s) 218, and/or one or more networks (e.g., cellular network 202, Internet 204, other network(s) 206, etc.), as described herein.

The browser module 406 may be configured to facilitate navigation, retrieval, and presentation of information resources (e.g., documents, content items, web resources, etc.) associated with the cellular network 202, the Internet 204, and/or other network(s) 206. In at least one example, the browser module 406 may enable the browser-enabled device 400 to register with a communication service that enables the browser-enabled device 400 to share a same account and/or same line with one or more other related devices (e.g., device 102A, device 102B, and/or device 102C). That is, based at least in part on registering with a cellular network 202 via the browser module 406, the cellular network 202 may forward calls and messages to the browser-enabled related device 400, and the browser-enabled related device 400 may be enabled to send or receive calls and messages in a same or similar way as with related devices (e.g., device 102A, device 102B, and/or device 102C). For instance, based at least in part on registering with a cellular network 202 via the browser module 406, incoming calls (e.g., voice calls, video calls, etc.) and messages (e.g., SMS messages, MMS messages, etc.) sent to a common communication address associated with the related devices (e.g., device 102A, device 102B, device 102C, and device 102D) may be sent to all of the related devices, including the browser-enabled related device 400.

The presence module 408 may be configured to retrieve presence information associated with one or more related devices (e.g., device 102A, device 102B, device 102C, and/or device 102D). As described above, presence information obtained from the presence server 220 may be utilized to identify related devices (e.g., device 102A, device 102B, device 102C, and device 102D). The presence module 408 may be configured to retrieve the presence information from the presence server 220, such as via OMA Presence SIMPLE protocol, or in some other fashion, as described above. In at least one example, the presence module 408 may provide presence information to the presence server 220. Additionally and/or alternatively, presence module 408 may be configured to provide capabilities information, described above, to the presence server 220.

The communication module 410 may facilitate communications between the browser-enabled device 400 and one or more other related devices (e.g., device 102B, device 102C, and device 102D) and/or an external device 106. For instance, the communication module 410 may facilitate sending calls, messages, etc. to one or more other related devices (e.g., device 102B, device 102C, and device 102D) and/or an external device 106 and/or receiving calls, messages, etc. from one or more other related devices (e.g., device 102B, device 102C, and device 102D) and/or an external device 106.

The contact synchronization module 412 may retrieve contact data that is stored in a network activity database 216 associated with the server(s) 218. In at least one example, the browser-enabled related device 400 may register with a cellular network 202 to activate the browser-enabled related device 400, as described above. In at least one example, based at least in part on registering with the cellular network 202, the contact synchronization module 412 may retrieve contact data from the server(s) 218. In at least one example, the contact synchronization module 412 may send a request for contact data from the server(s) 218. In such an example, the contact synchronization module 412 may receive contact data from the server(s) 218 in response to the request. In other examples, the server(s) 218 may push contact data to the contact synchronization module 412 without first receiving a request. Based at least in part on receiving contact data, the contact synchronization module 412 may cause the contact data to be stored in a local contact database 418.

The local contact database 418 may correspond to a local contact database (e.g., local contact database 212D) described above with reference to FIG. 2. That is, the local contact database 418 may store contact data. In at least one example, one or more data items may be mapped to, or otherwise associated with, individual contacts, as described above. As described above, data items associated with a contact may include a communication address, physical address, e-mail address, demographic information, etc. In some examples, the local contact database 418 may be integral to the browser-enabled related device 400. In other examples, the local contact database 418 may be communicatively coupled to the browser-enabled related device 400.

In at least one example, contact data that is stored in the local contact database 418 may be updated. For instance, a user associated with the browser-enabled device 400 may add a new contact and may therefore cause one or more new data items to be mapped to, or otherwise associated with, the new contact the local contact database 418. Additionally and/or alternatively, a user associated with the browser-enabled device 400 may delete a contact and may therefore cause all of the data items mapped to, or otherwise associated with, the contact that has been deleted to be deleted. Moreover, in some examples, a user associated with the browser-enabled device 400 may update data associated with a particular contact of the one or more contacts. For instance, a user associated with the browser-enabled device 400 may cause a new data item to be mapped to, or otherwise associated with, a new contact or cause a data item that is mapped to, or otherwise associated with, a contact to be updated or deleted.

In at least one example, the contact synchronization module 412 may provide an indication to the server(s) 218 that contact data has been modified. In some examples, the indication may include instructions to map, or otherwise associate, one or more new data items to a new contact to be added to the contact data that is stored in the network activity database 216. Additionally and/or alternatively, the indication may include instructions to delete one or more data items that are mapped to, or otherwise associated with, a contact that has been deleted. Moreover, in at least one example, the indication may include instructions to update one or more data items that are mapped to, or otherwise associated with, a contact to which at least a portion of the contact data that is stored in the network activity database 216 corresponds.

In at least one example, the contact synchronization module 412 may provide an indication to the server(s) 218 indicating that contact data has been modified responsive to the modification. That is, a modification to contact data may cause the contact synchronization module 412 to send an indication associated with the modification to the server(s) 218. In alternative examples, the contact synchronization module 412 may send contact data to the server(s) 218 at a particular frequency (e.g., every hour, every day, etc.), after a lapse in a period of time (e.g., 40 minutes, 60 minutes, etc.), etc. and any modifications to contact data may be reflected in the content data sent to the server(s) 218.

In at least one example, the contact synchronization module 412 may receive instructions associated with a modification to contact data. That is, the contact synchronization module 412 may receive instructions indicating that another one of the related devices (e.g., device 102A, device 102B, and/or device 102C) modified contact data and specifying the modification(s). Based at least in part on receiving the instructions, the contact synchronization module 412 may cause the contact data stored in the local contact database 418 to be updated to reflect the modification.

In at least one example, related devices that are cellular communication devices (e.g., device 102A, device 102B, and device 102C) may be considered primary devices and related devices that are browser-enabled devices (e.g., device 102D) may be considered secondary devices. In such examples, the related devices that are cellular communication devices (e.g., device 102A, device 102B, and device 102C) may determine a modification policy, as described above, that indicates whether related devices that are browser-enabled devices (e.g., device 102D) are permitted to modify contact data and/or modifications (e.g., add a new contact, delete a contact, update a contact) that the related devices that are browser-enabled devices (e.g., device 102D) are permitted to perform. That is, in such examples, related devices that are browser-enabled devices (e.g., device 102D) may not determine a modification policy. Accordingly, browser-enabled device 400 is illustrated without a modification policy.

While browser-enabled device 400 may not be associated with a modification policy—that is, browser-enabled device 400 may not determine the modification policy—modifications performed by the browser-enabled device 400 may be subject to a modification policy. As described below, the server(s) 218 may be associated with a modification policy and may determine whether modifications to contact data by the browser-enabled device 400 are permitted per the modification policy.

The database management module 414 may manage the local contact database 418. In at least one example, the database management module 414 may define the local contact database 418, create the local contact database 418, receive and/or determine data stored in the local contact database 418, analyze data stored in the local contact database 418, manage data stored in the local contact database 418, update data stored in the local contact database 418, and otherwise administer the local contact database 418. In at least one example, based at least in part on receiving contact data from the server(s) 218, the database management module 414 may create the local contact database 418. Additionally, in at least one example, the database management module 414 may modify contact data that is stored in the local contact database 418 based at least in part on receiving an indication that another related device (e.g., device 102B, device 102C, and/or device 102D) added a new contact, deleted a contact, updated a contact, etc. That is, the database management module 414 may update data in the local contact database 418 by adding new data that is mapped to, or otherwise associated with, a new contact, removing data items mapped to, or otherwise associated with, a contact that has been deleted, and/or updating one or more data items mapped to, or otherwise associated with, a contact.

The UI module 416 may be configured to cause a presentation of a graphical representation of at least some of the data in the local contact database 418 via a display device 420 associated with the browser-enabled device 400. In at least one example, the UI module 416 may generate a graphical user interface 422 that may be presented via the display device 420. Graphical user interface 422 is a non-limiting example of a graphical user interface presenting a plurality of contacts. As shown, a first region 424A of the graphical user interface 422 is associated with contacts and a second region 424B of the graphical user interface 426 is associated with communication functionality. For instance, a user may initiate a call, answer a call, send a message, receive a message, etc. via the second region 424B of the graphical user interface 424.

As shown in FIG. 4, each contact is associated with a user interface element (e.g., Contact A is associated with user interface element 426A, Contact B is associated with user interface element 426B, Contact C is associated with user interface element 426C, Contact D is associated with user interface element 426D). In at least one example, the graphical user interface 422 may be interactive such to enable a user associated with the browser-enabled device 400 to select a user interface element (e.g., user interface element 426A, user interface element 426B, user interface element 426C, or user interface element 426D) associated with a contact to access additional and/or alternative information than what is presented on the graphical user interface 424. That is, in at least one example, the user interface elements (e.g., user interface element 426A, user interface element 426B, user interface element 426C, or user interface element 426D) may be associated with a control, hyperlink, overlay, etc., which may be actuated to present additional and/or alternative information via the graphical user interface 402. Additionally and/or alternatively, a user associated with the browser-enabled device 400 may select a user interface element (e.g., user interface element 426A, user interface element 426B, user interface element 426C, or user interface element 426D) associated with a contact to initiate a communication that is directed to that contact. That is, in at least one example, the user interface elements (e.g., user interface element 426A, user interface element 426B, user interface element 426C, or user interface element 426D) may be associated with a control, hyperlink, overlay, etc., which may be actuated to initiate a call, send a message, etc. to a device associated with the selected contact.

As described herein, in at least one example, one or more of the other related devices (e.g., device 102A, device 102B, and/or device 102C) may modify the data associated with the contacts. In such examples, the UI module 416 may cause a notification to be presented via the graphical user interface 422 that may be used to notify a user that a modification has occurred and, in some examples, which contact has been modified. A non-limiting example of a notification 428 is shown in association with user interface element 426D (i.e., Contact D). In alternative examples, a symbol, an animation, or some other mechanism may be used to notify a user that a modification has occurred and, in some examples, which contact has been modified. In some examples, the notification 428 or other mechanism may identify which of the related devices (e.g., device 102B, device 102C, and/or device 102D) modified the contact data, modification(s) associated with the contact data, etc.

Radio hardware 430 provides wireless UE capabilities, such as connecting to a cellular network base station, a Wi-Fi network, or other wireless networks. The radio hardware 340 may include or be incorporated into processors, application-specific integrated circuits (ASICs), programmable circuits such as field programmable gate arrays (FPGAs), or in other ways. The software modules stored on the computer-readable media 404 are configured to access hardware via interrupts, calling APIs, and the like. The software modules may also be configured to pass information to one another, such as through APIs, by storing commands, parameters, etc. in a predetermined memory location, etc. Other examples are possible without departing from the scope of this disclosure.

Figure 5:
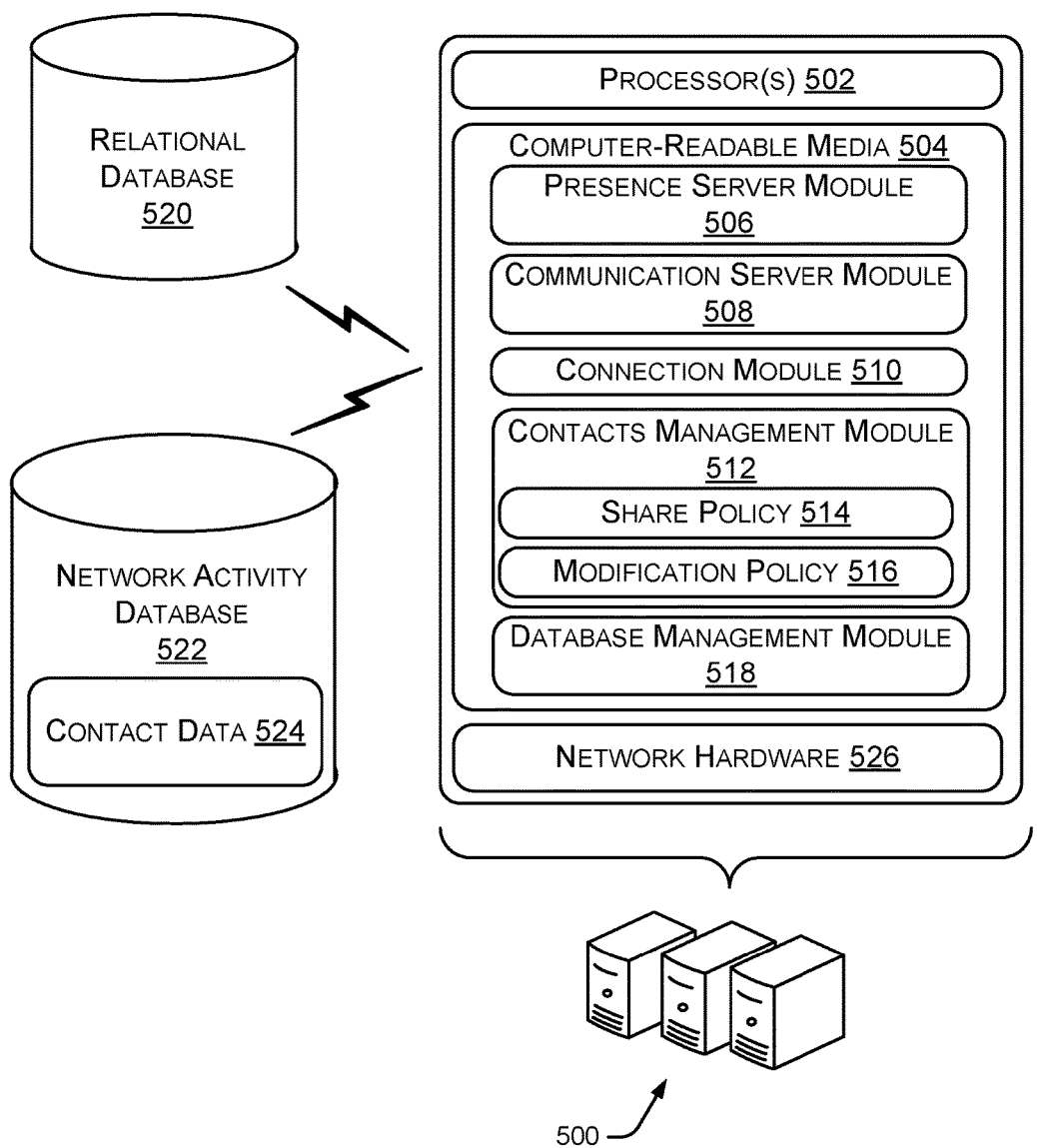
FIG. 5 illustrates example server(s) configured to facilitate synchronizing contacts between related devices.

FIG. 5 illustrates example server(s) 500 configured to facilitate synchronizing contacts between related devices. In at least one example, servers 500 may correspond to server(s) 218 with reference to FIG. 2. As illustrated in FIG. 5, the server(s) 500 include processor(s) 502 and computer-readable media 504. Processor(s) 502 may have the same structure and perform the same function(s) as processor(s) 302 described above with reference to FIG. 3. Computer-readable media 504 may have the same structure and perform the same function(s) as computer-readable media 304 described above with reference to FIG. 3.

The computer-readable media 504 may include one or more modules and data structures including, for example, a presence server module 506, a communication server module 508, a connection module 510, a contacts management module 512, including a share policy 514 and a modification policy 516, and a database management module 518. The one or more modules and data structures may be in the form of stand-alone applications, productivity applications, an operating system component, or any other application or software module having data items that facilitate interactions between the server(s) 500, one or more related devices (e.g., device 102A, device 102B, device 102C, and/or device 102D), and/or one or more networks (e.g., cellular network 202, Internet 204, and/or other network(s) 206), as described herein.

The presence server module 506 may provide presence server services to devices, including the related devices (e.g., device 102A, device 102B, device 102C, and/or device 102D). The presence server module 506 may be configured to register online presence information of various devices, and/or to provide presence information and/or capabilities information, as described above, regarding the various devices. The presence server module 506 may look up information regarding groups of related devices in a relational database 526, described below, and provide presence information and/or capabilities information regarding those related devices (e.g., device 102A, device 102B, device 102C, and/or device 102D) to other ones of the related devices (e.g., device 102A, device 102B, device 102C, and/or device 102D). The presence server module 506 may be configured to provide presence information and/or capabilities information using OMA Presence SIMPLE protocol, or in some other fashion.

The communication server module 508 may provide communication server services to devices, including the related devices (e.g., device 102A, device 102B, device 102C, and/or device 102D) and/or external devices (e.g., device 106). That is, the communication server module 508 may facilitate sending and receiving calls, messages, etc. to and/or from the related devices (e.g., device 102A, device 102B, device 102C, and/or device 102D) and/or external devices (e.g., device 106).

The connection module 510 may be configured, in some embodiments, to facilitate establishment of connections between devices, including establishment of connections between related devices (e.g., device 102A, device 102B, device 102C, and/or device 102D. In at least one example, the contacts management module 512 may leverage presence information associated with the related devices (e.g., device 102A, device 102B, device 102C, and/or device 102D) to facilitate establishment of connections between related devices (e.g., device 102A, device 102B, device 102C, and/or device 102D). As described above, the presence server module 506 may be configured to register online presence information of various devices, and/or to provide presence information and/or capabilities information. The presence server module 506 may look up information regarding groups of related devices in a relational database 526, described below, and provide presence information and/or capabilities information regarding those related devices (e.g., device 102A, device 102B, device 102C, and/or device 102D) to the connection module 510.

The contacts management module 512 may facilitate synchronization of contacts between related devices (e.g., device 102A, device 102B, device 102C, and/or device 102D). As described above with reference to FIG. 3, a contact synchronization module 310 associated with a related device that is a cellular communication device 300 may access contact data that is stored in a local contact base 318 and may provide contact data to the server(s) 218. That is, in at least one example, a contact synchronization module 310 associated with a related device that is a cellular communication device 300 may access contact data that is stored in a local contact base 318 and may provide contact data to the contacts management module 512. In at least one example, the contacts management module 512 may receive contact data and may cause the contact data to be stored in a network activity database 522, as is illustrated in FIG. 5 by contact data 524.

In at least one example, the contacts management module 512 may receive contact data from the cellular communication device 300 based at least in part on receiving an indication that a browser-enabled related device 400 registered with the cellular network 202. In at least one example, based at least in part on receiving an indication that a browser-enabled related device 400 registered with the cellular network 202, the contacts management module 512 may send a request for contact data to a cellular communication device 300. In such an example, the contacts management module 512 may receive contact data from the cellular communication device 300 in response to the request. In other examples, based at least in part on receiving an indication that a browser-enabled related device 400 registered with the cellular network 202, the cellular communication device 300 may push contact data to the contacts management module 512 without first receiving a request.

As described above with reference to FIG. 4, a related device that is a browser-enabled related device 400 may register with a cellular network 202 to activate the browser-enabled related device 400. In at least one example, based at least in part on determining that a browser-enabled related device 400 registered with the cellular network 202, the contacts management module 512 may retrieve contact data from the server(s) 218. That is, in at least one example, based at least in part on the browser-enabled related device 400 registering with the cellular network 202, the contacts management module 512 may retrieve contact data 524 from the network activity database 522. In at least one example, the contacts management module 512 may receive a request for contact data from the browser-enabled related device 400. In such an example, the contacts management module 512 may access the content data 524 from the network activity database 522 and may send the contact data 524 to the browser-enabled related device 400 in response to the request. In other examples, the contacts management module 512 may push contact data 524 to the browser-enabled related device 400 without first receiving a request.

In at least one example, the contacts management module 512 may be configured to utilize a share policy 514 to determine whether the browser-enabled related device 400 is permitted to receive the contact data 524. A share policy may identify which of the related devices (e.g., device 102A, device 102B, device 102C, and/or device 102D) contact data may be shared with and/or what portions of the contact data may be shared with particular related devices (e.g., device 102A, device 102B, device 102C, and/or device 102D). The share policy 514 may be based at least in part on presence information, capabilities information, and/or preference information. In at least one example, the share policy 514 may indicate that contact data may be shared with related devices (e.g., device 102A, device 102B, device 102C, and/or device 102D), and that such contact data may not to be shared with other devices that do not share a line or account. In other examples, the share policy 514 may indicate that contact data may be shared with certain related devices (e.g., device 102A, device 102B, device 102C, and/or device 102D), and that such contact data may not to be shared with other related devices (e.g., device 102A, device 102B, device 102C, and/or device 102D). In some examples, the share policy 514 may indicate that data associated with particular contacts of the one or more contacts may be shared with certain related devices (e.g., device 102A, device 102B, device 102C, and/or device 102D), and that such data associated with the particular contacts may not to be shared with other related devices (e.g., device 102A, device 102B, device 102C, and/or device 102D).

Additionally, the contacts management module 512 may receive indications and/or instructions regarding modifications to contact data from one or more related devices (e.g., device 102A, device 102B, device 102C, and/or device 102D). In at least one example, a contact synchronization module associated with a related device (e.g., contract synchronization module 310 and/or contact synchronization module 412) may provide an indication to the server(s) 500 indicating that contact data has been modified. In some examples, the indication may include instructions to map, or otherwise associate, one or more new data items to a new contact to be added to the contact data 524 that is stored in the network activity database 522. Additionally and/or alternatively, the indication may include instructions to delete one or more data items mapped to, or otherwise associated with, a contact that has been deleted. Moreover, in at least one example, the indication may include instructions to update one or more data items mapped to, or otherwise associated with, a contact to which at least a portion of the contact data 524 that is stored in the network activity database 522 corresponds.

In at least some examples, the contacts management module 512 may check a modification policy 516 to ensure that the related device sending indications and/or instructions regarding modifications is permitted to make said modifications. The modification policy 516 may be provided by one or more of the related devices (e.g., device 102A, device 102B, device 102C, and/or device 102D). As described above with reference to FIG. 3 (and modification policy 312), the modification policy 516 may correspond to a policy that identifies which related devices (e.g., device 102A, device 102B, device 102C, and/or device 102D) are permitted to modify contact data. In at least one example, the modification policy 516 may also identify which modifications (e.g., add a new contact, delete a contact, update a contact, etc.) are permitted by particular related devices (e.g., device 102A, device 102B, device 102C, and/or device 102D). Based at least in part on determining that a modification is permitted via the modification policy 516, the contacts management module 512 may send indications and/or instructions regarding the modifications to one or more related devices (e.g., device 102A, device 102B, device 102C, and/or device 102D) and send an indication to the database management module 518, described below, to update the data in the contact data 524 to reflect the modification. Based at least in part on determining that a modification is not permitted via the modification policy 516, the contacts management module 512 may send an indication to a related device that sent an indication and/or instruction regarding the modification indicating that the modification to the contact data 524 is not permitted.

Additionally and/or alternatively, the contacts management module 512 may leverage presence information associated with the related devices (e.g., device 102A, device 102B, device 102C, and/or device 102D) to determine whether the related devices are online and/or are capable of receiving indications and/or instructions associated with modifications of contact data. As described above, the presence server module 506 may be configured to register online presence information of various devices, and/or to provide presence information and/or capabilities information. The presence server module 506 may look up information regarding groups of related devices in a relational database 526, described below, and provide presence information and/or capabilities information regarding those related devices (e.g., device 102A, device 102B, device 102C, and/or device 102D) to the contacts management module 512.

Based at least in part on determining that a modification is permitted via the modification policy 516, the contacts management module 512 may send indications and/or instructions regarding the modifications to one or more related devices (e.g., device 102A, device 102B, device 102C, and/or device 102D). In at least one example, the contacts management module 512 may determine that the one or more related devices are online and/or are capable of receiving indications and/or instructions associated with modifications of contact data prior to sending the indications and/or instructions regarding the modifications.

The database management module 518 may be configured to manage the relational database 526 and/or the network activity database 522 associated with the server(s) 500. In some examples, the relational database 526 and/or the network activity database 522 may be integral to the server(s) 500. In other examples, the relational database 526 and/or the network activity database 522 may be communicatively coupled to the server(s) 500. In at least one example, the relational database 526 may correspond to the relational database 214 described above with reference to FIG. 2 and the network activity database 522 may correspond to the network activity database 216 described above with reference to FIG. 2. That is, the relational database 526 may store line and/or account associations for related devices (e.g., device 102A, device 102B, device 102C, and/or device 102D) and the network activity database 522 may store data corresponding to communication events associated with the related devices (e.g., device 102A, device 102B, device 102C, and/or device 102D) and contact(s) 524, as described above.

In at least one example, the database management module 518 may define the relational database 526 and/or the network activity database 522, create the relational database 526 and/or the network activity database 522, receive and/or determine data that is stored in the relational database 526 and/or the network activity database 522, analyze data that is stored in the relational database 526 and/or the network activity database 522, update data that is stored in the relational database 526 and/or the network activity database 522, and otherwise administer the relational database 526 and/or the network activity database 522. In at least one example, the database management module 518 may modify contact data 524 that is stored in the network activity database 522. That is, based at least in part on receiving an indication that a related device (e.g., device 102A, device 102B, device 102C, and/or device 102D) added a new contact, deleted a contact, updated a contact, etc., the database management module 518 may update data in the contact data 524 by mapping, or otherwise associating, one or more new data items to a new contact, deleting data items mapped to, or otherwise associated with, a contact that has been deleted, and/or updating one or more data items mapped to, or otherwise associated with, a contact.

Network hardware 526 provides wired or wireless networking capabilities to the server(s) 500. The network hardware 526 may include or be incorporated into processors, application-specific integrated circuits (ASICs), programmable circuits such as field programmable gate arrays (FPGAs), or in other ways. The software modules stored on the computer-readable media 504 are configured to access hardware via interrupts, calling APIs, and the like. The software modules may also be configured to pass information to one another, such as through APIs, storing commands, parameters, etc. in a predetermined memory location, etc. Other examples are possible without departing from the scope of this disclosure.

FIGS. 6-9 describe example processes for facilitating contact synchronization between related devices. The example processes are described in the context of the environments of FIGS. 1-5, but are not limited to those environments.

FIG. 6 illustrates an example process 600 for synchronizing contacts between related devices, from the perspective of one or more servers 500.

Block 602 illustrates receiving an indication of a registration of a browser-enabled device 400 with a network (e.g., a cellular network 202, the Internet 204, and/or one or more other network(s) 206) to utilize a communication address for sending and receiving communications via the network. As described above with reference to FIG. 4, a related device that is a browser-enabled related device 400 may register with a network to activate the browser-enabled related device 400. In at least one example, the contacts management module 512 associated with the one or more servers 500 may receive an indication that a browser-enabled device 400 registered with the network.

Block 604 illustrates retrieving contact data from at least one device that is related to the browser-enabled device 400.

As described above, a device may be related to the browser-enabled device 400 based at least partly on the device and the browser-enabled device 400 utilizing a same communication address for sending and receiving at least communications via the network or being associated with a same subscriber account. The cellular communication device 300 described above with reference to FIG. 3 is an example of such a device.

As described above with reference to FIG. 3, in at least one example, a contact synchronization module 310 associated with a related device that is a cellular communication device 300 may access contact data that is stored in a local contact database 318 and may provide contact data to a contacts management module 512 associated with the one or more servers 500. As described above with reference to FIG. 5, the contacts management module 512 may receive contact data from the cellular communication device 300 based at least in part on receiving an indication that a browser-enabled related device 400 registered with the network. In at least one example, the contacts management module 512 may receive contact data from the cellular communication device 300 in response to a request. In other examples, based at least in part on receiving an indication that a browser-enabled related device 400 registered with the network, the cellular communication device 300 may push contact data to the contacts management module 512 without first receiving a request.

Block 606 illustrates storing the contact data in a database. As described above with reference to FIG. 5, in at least one example, the contacts management module 512 may receive contact data and may cause the contact data to be stored in a network activity database 522 associated with the one or more servers 500. In such examples, the database management module 518 may facilitate storing the contact data in the network activity database 522.

Block 608 illustrates providing the contact data to the browser-enabled device 400. As described above with reference to FIG. 5, in at least one example, based at least in part on determining that the browser-enabled related device 400 registered with the network, the contacts management module 512 may retrieve contact data from the network activity database 522. In at least one example, the contacts management module 512 may send the contact data to the browser-enabled related device 400 in response to a request. In other examples, the contacts management module 512 may push contact data to the browser-enabled related device 400 without first receiving a request. As described herein, based at least in part on providing the contact data to the browser-enabled device 400, the browser-enabled device 400 may access contact data associated with other related devices (e.g., cellular communication device 300) thereby synchronizing contacts between related devices (e.g., cellular communication device 300, browser-enabled device 400, etc.).

Figure 7:
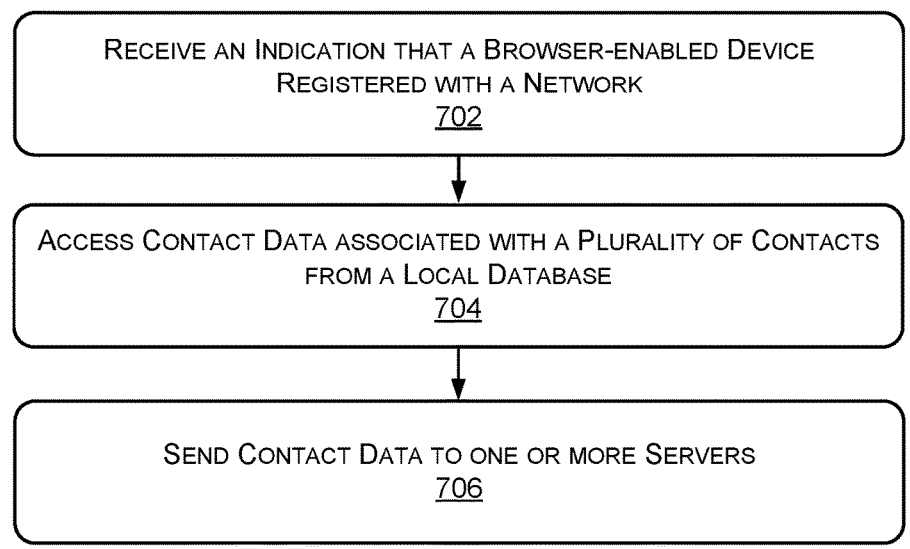
FIG. 7 illustrates another example process for synchronizing contacts between related devices.

FIG. 7 illustrates yet another example process 700 for synchronizing contacts between related devices, from the perspective of a cellular communication device 300.

Block 702 illustrates receiving an indication that a browser-enabled device 400 registered with a network (e.g., a cellular network 202, the Internet 204, and/or one or more other network(s) 206). As described above with reference to FIG. 4, in at least one example, the browser-enabled device 400 may register with the network to utilize a communication address that is shared with the cellular communication device 300 for sending and receiving at least communications via the network. As described above, in some examples, the browser-enabled device 400 may additionally and/or alternatively be associated with a same subscriber account as the cellular communication device 300.

Block 704 illustrates accessing contact data associated with a plurality of contacts from a local database. As described above with reference to FIG. 3, in at least one example, the contact synchronization module 310 associated with the cellular communication device 300 may access contact data that is stored in a local contact base 318 associated with the cellular communication device 300. As described above, the local contact database 318 may store contact data. In at least one example, one or more data items may be mapped to, or otherwise associated with, individual contacts. As described above, data items that are mapped to, or otherwise associated with, a contact may include a communication address, physical address, e-mail address, demographic information, etc.

Block 706 illustrates sending the contact data to one or more servers 500. As described above with reference to FIG. 3, in at least one example, based at least in part on receiving the indication, the contact synchronization module 310 may provide contact data to the server(s) 500. In at least one example, the contact synchronization module 310 may send contact data to the server(s) 500 in response to a request. In other examples, the contact synchronization module 310 may provide contact data to the server(s) 500 without first receiving a request. As described above, the server(s) 500 may store the contact data in the network activity database 522 for synchronizing contacts between related devices (e.g., cellular communication device 300, browser-enabled device 400, etc.).

Figure 8:
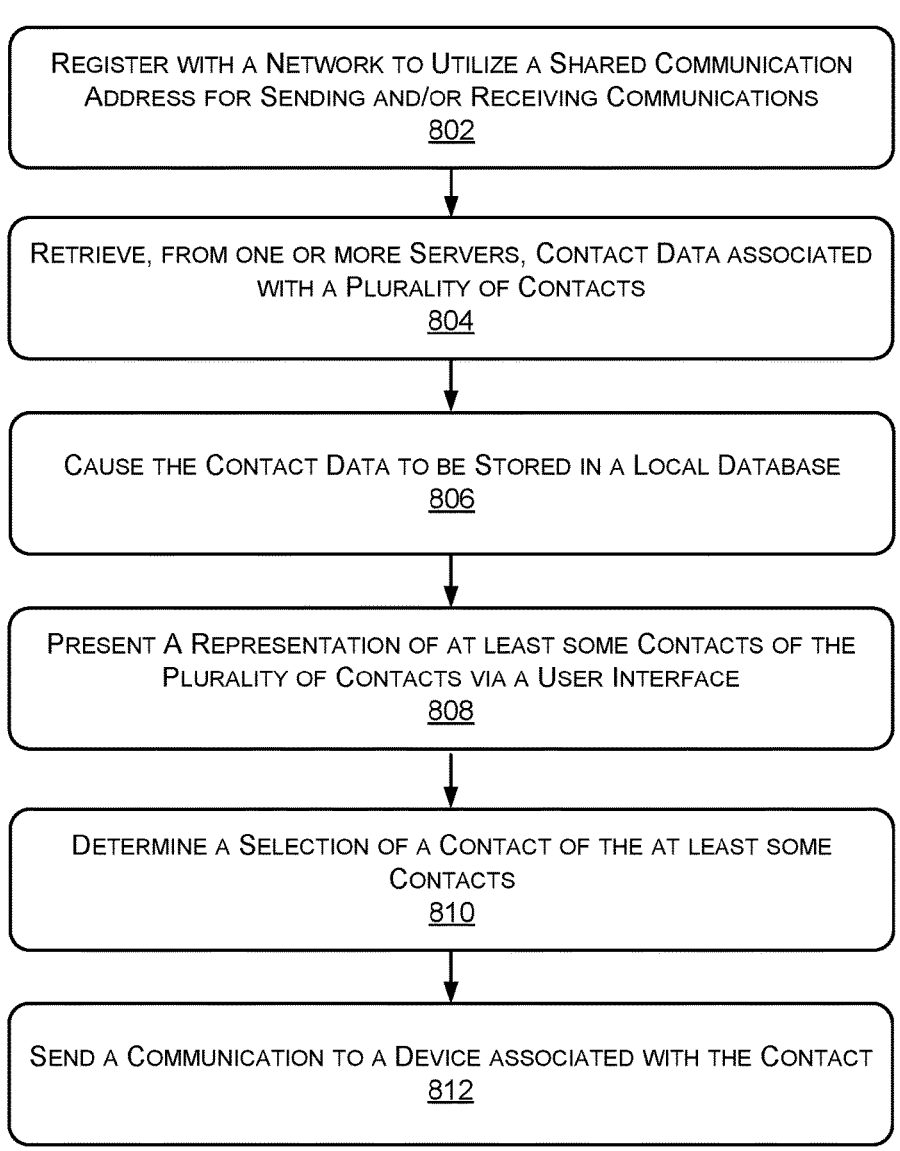
FIG. 8 illustrates yet another example process for synchronizing contacts between related devices.

FIG. 8 illustrates another example process 800 for synchronizing contacts between related devices, from the perspective of a browser-enabled related device 400.

Block 802 illustrates registering with a network (e.g., a cellular network 202, the Internet 204, and/or one or more other network(s) 206) to utilize a communication address for sending and receiving communications via the network. As described above with reference to FIG. 4, in at least one example, a browser-enabled related device 400 may be activated such that the browser-enabled related device 400 registers with a network to utilize a communication address for sending and receiving communications via the network. As described above, in at least one example, the communication address may be shared by at least one related device for sending and receiving communications via the network. The at least one related device may correspond to a cellular communication device 300, as described above with reference to FIG. 3.

Block 804 illustrates retrieving, from one or more servers 500, contact data associated with a plurality of contacts. As described above with reference to FIG. 4, in at least one example, based at least in part on registering with the network (e.g., the cellular network 202, the Internet 204, and/or one or more other network(s) 206), a contact synchronization module 412 associated with the browser-enabled device 400 may retrieve contact data from the server(s) 500. In at least one example, the contact synchronization module 412 may receive contact data from the server(s) 500 in response to a request. In other examples, the server(s) 500 may push contact data to the contact synchronization module 412 without first receiving a request.

Block 806 illustrates causing the contact data to be stored in a local database. As described above with reference to FIG. 4, based at least in part on receiving contact data, the contact synchronization module 412 may cause the contact data to be stored in a local contact database 418 associated with the browser-enabled device 400. In at least one example, based at least in part on receiving contact data from the server(s) 500, the database management module 414 may create the local contact database 418. That is, in at least one example, the contact synchronization module 412 may synchronize the contact data stored in a local contact database 418 associated with the browser-enabled device 400 with contact data stored in local contact database(s) associated with other related device(s) (e.g., cellular communication device 300, etc.).

Block 808 illustrates presenting a representation of at least some contacts of the plurality of contacts via a user interface. As described above with reference to FIG. 4, a UI module 416 associated with the browser-enabled device 400 may be configured to cause a presentation of a graphical representation of at least some of the data in the local contact database 418 via a display device 420 associated with the browser-enabled device 400. In at least one example, the UI module 416 may generate a graphical user interface 422 that may be presented via the display device 420. The graphical user interface 422 may present a representation of at least some of the contacts associated with the contact data stored in the local contact database 418. As described above with reference to FIG. 4, each contact may be associated with a user interface element (e.g., Contact A is associated with user interface element 426A, Contact B is associated with user interface element 426B, Contact C is associated with user interface element 426C, Contact D is associated with user interface element 426D). In at least one example, the graphical user interface 422 may be interactive such to enable a user associated with the browser-enabled device 400 to select a user interface element (e.g., user interface element 426A, user interface element 426B, user interface element 426C, or user interface element 426D) associated with a contact to access additional and/or alternative information than what is presented on the graphical user interface 424 and/or to initiate a communication that is directed to that contact.

Block 810 illustrates determining a selection of a contact of the at least some contacts. As described above with reference to FIG. 4, in at least one example, a user associated with the browser-enabled device 400 may select a user interface element (e.g., user interface element 426A, user interface element 426B, user interface element 426C, or user interface element 426D) associated with a contact to initiate a communication that is directed to that contact. That is, in at least one example, the user interface elements (e.g., user interface element 426A, user interface element 426B, user interface element 426C, or user interface element 426D) may be associated with a control, hyperlink, overlay, etc., which may be actuated to initiate a call, message, etc. In at least one example, the communication module 410 may determine the selection of the contact.

Block 812 illustrates sending a communication to a device associated with the contact. As described above with reference to FIG. 4, the communication module 410 may facilitate communications between the browser-enabled device 400 and one or more other related devices (e.g., device 102B, device 102C, and device 102D) and/or an external device 106. In at least one example, based at least in part on the communication module 410 determining the selection of the contact, the communication module 410 may facilitate sending a call, a message, etc. to a device corresponding to the contact. In at least one example, the communication module 410 may leverage the browser module 406 to facilitate sending a call, a message, etc. to a device corresponding to the contact via a browser (e.g., a web browser).

Figure 9:
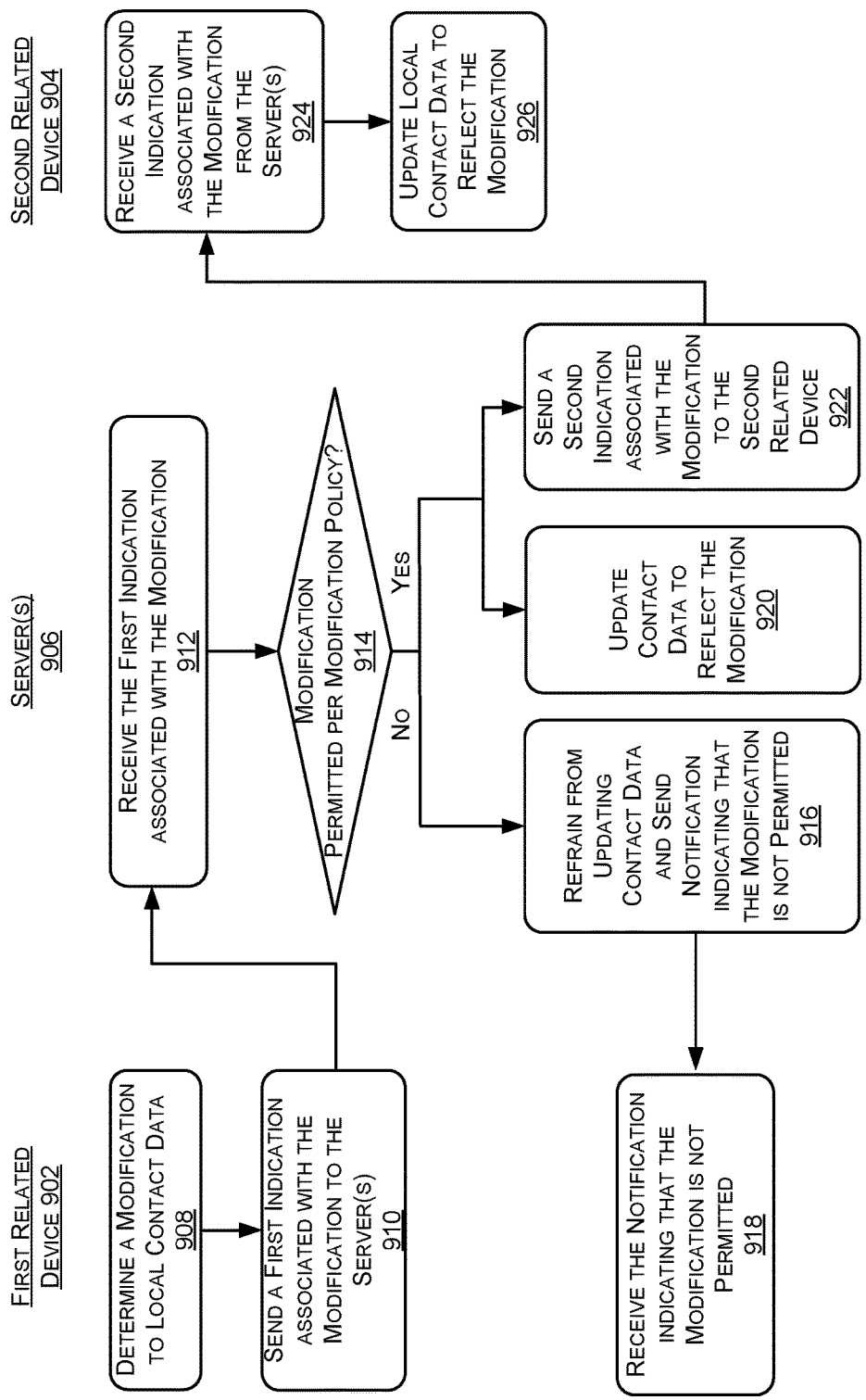
FIG. 9 illustrates an example process for synchronizing modifications to contacts between related devices.

FIG. 9 illustrates an example process 900 for synchronizing modifications to contacts between related devices. In FIG. 9, a first related device 902 and a second related device 904 may correspond to any of the related devices (e.g., device 102A, device 102B, device 102C, and/or device 102D). In at least one example, either the first related device 902 or the second related device 904 is a cellular communication device 300 and the other device is a browser-enabled device 400. The first related device 902 and/or the second related device 904 may communicate with the server(s) 906 for synchronizing modifications to contacts between the first related device 902 and/or the second related device 904. The server(s) 906 may correspond to server(s) 500, as described above with reference to FIG. 5.

Block 908 illustrates determining, by the first related device 902, a modification to local contact data. As described above with reference to FIGS. 3 and 4, in at least one example, contact data that is stored in a local contact database (e.g., local contact database 318 or local contact database 418) may be updated. For instance, a user associated with a first related device 902 may add a new contact and may therefore cause one or more new data items to be mapped to, or otherwise associated with, the new contact in the local contact database. Additionally and/or alternatively, a user associated with a first related device 902 may delete a contact and may therefore cause all of the data items mapped to, or otherwise associated with, the contact that has been deleted to be deleted. Moreover, in some examples, a user associated with the a first related device 902 may update data associated with a particular contact of the one or more contacts. For instance, a user associated with the a first related device 902 may cause a new data item to be mapped to, or otherwise associated with, a new contact or cause a data item that is mapped to, or otherwise associated with, a contact to be updated or deleted.

Block 910 illustrates sending, from the first related device 902, a first indication associated with the modification to the server(s) 906. As described above with reference to FIGS. 3 and 4, in at least one example, a contact synchronization module (e.g., contact synchronization module 310 or contact synchronization module 412) associated with the first related device 902 may provide an indication to the server(s) 906 indicating that contact data has been modified. In some examples, the indication may include instructions to map, or otherwise associate, one or more new data items to a new contact to be added to the contact data that is stored in a network activity database associated with the server(s) 906. Additionally and/or alternatively, the indication may include instructions to delete one or more data items that are mapped to, or otherwise associated with, a contact that has been deleted. Moreover, in at least one example, the indication may include instructions to update one or more data items that are mapped to, or otherwise associated with, a contact to which at least a portion of the contact data that is stored in the network activity database corresponds.

In at least one example, a modification to contact data may cause the contact synchronization module to send an indication associated with the modification to the server(s) 906. In alternative examples, the contact synchronization module may send contact data to the server(s) 906 at a particular frequency (e.g., every hour, every day, etc.), after a lapse in a period of time (e.g., 40 minutes, 60 minutes, etc.), etc. and any modifications to contact data may be reflected in the data sent to the server(s) 906.

Block 912 illustrates receiving, by the server(s) 906, the first indication associated with the modification. As described above with reference to FIG. 5, a contacts management module 512 associated with the server(s) 500 may receive indications and/or instructions regarding modifications to contact data from one or more related devices. In some examples, an indication may include instructions to map, or otherwise associate, one or more new data items to a new contact to be added to the contact data that is stored in network activity database 522 associated with the server(s) 500. Additionally and/or alternatively, an indication may include instructions to delete one or more data items mapped to, or otherwise associated with, a contact that has been deleted. Moreover, in at least one example, an indication may include instructions to update one or more data items mapped to, or otherwise associated with, a contact to which at least a portion of the contact data that is stored in the network activity database 522 corresponds.

Block 914 illustrates determining, by the server(s) 906, whether the modification is permitted per a modification policy. As described above with reference to FIG. 5, in at least some examples, the contacts management module 512 may check a modification policy 516 to ensure that the related device (e.g., first related device 902) sending indications and/or instructions regarding modifications is permitted to make said modifications. Based at least in part on determining that a modification is not permitted via the modification policy 516, the contacts management module 512 may not update contact data stored in the network activity database 522 and may send a notification to a related device that sent an indication and/or instruction regarding the modification indicating that the modification to the contact data is not permitted. Block 916 illustrates refraining from updating contact data and sending a notification indicating that the modification is not permitted to the first related device 902. Block 918 illustrates receiving, by the first related device 902, the notification indicating that the modification is not permitted.

Based at least in part on determining that a modification is permitted via the modification policy 516, the contacts management module 512 may send indications and/or instructions regarding the modifications to one or more related devices and send an indication to the database management module 518 to update the data in the contact(s) 524 to reflect the modification.

Block 920 illustrates updating, by the server(s) 906, contact data to reflect the modification. As described above with reference to FIG. 5, in at least one example, a database management module 518 associated with the server(s) 500 may modify contact data that is stored in the network activity database 522. That is, based at least in part on receiving an indication that a related device added a new contact, deleted a contact, updated a contact, etc., the database management module 518 may update contact data in the network activity database 522 by mapping, or otherwise associating, one or more new data items to a new contact, removing data items mapped to, or otherwise associated with, a contact that has been deleted, and/or updating one or more data items mapped to, or otherwise associated with, a contact.

Block 922 illustrates sending, from the server(s) 906, a second indication associated with the modification to the second related device 906. As described above with reference to FIG. 5, based at least in part on determining that a modification is permitted via the modification policy 516, the contacts management module 512 may send indications and/or instructions regarding the modifications to one or more related devices. In at least one example, the contacts management module 512 may determine that the one or more related devices are online and/or are capable of receiving indications and/or instructions associated with modifications of contact data prior to sending the indications and/or instructions regarding the modifications.

Block 924 illustrates receiving, by the second related device 906, the second indication associated with the modification from the server(s) 906. As described above with reference to FIGS. 3 and 4, in at least one example, a contact synchronization module (e.g., contact synchronization module 310 or contact synchronization module 412) associated with a related device may receive instructions associated with a modification to contact data. That is, the contact synchronization module may receive instructions indicating that another related device modified contact data and specifying the modification(s). Based at least in part on receiving the instructions, the contact synchronization module may cause the contact data stored in a local contact database (e.g., local contact database 318 or local contact database 418) to be updated to reflect the modification.

Block 926 illustrates updating, by the second related device 906, local contact data to reflect the modification 926. As described above with reference to FIGS. 3 and 4, a database management module (e.g., database management module 314 and database management module 414) may modify contact data that is stored in a local contact database (e.g., local contact database 318 or local contact database 418). As described above, the database management module may update data in the local contact database by adding new data that is mapped to, or otherwise associated with, a new contact, removing data items mapped to, or otherwise associated with, a contact that has been deleted, and/or updating one or more data items mapped to, or otherwise associated with, a contact.

The processes described above in association with FIGS. 6-9 may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. In other embodiments, hardware components perform one or more of the operations. Such hardware components may include or be incorporated into processors, application-specific integrated circuits (ASICs), programmable circuits such as field programmable gate arrays (FPGAs), or in other ways. The order in which the operations are described is not intended to be construed as a limitation, and any number of the described operations may be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving, by one or more serving devices, a first indication of a registration of a first device with a network to utilize a communication address for sending and receiving communications via the network;
   retrieving, by the one or more serving devices and based at least in part on receiving the first indication, data associated with a plurality of contacts associated with a second device, the second device utilizing the communication address or being associated with a same subscriber account as the first device;

storing the data associated with the plurality of contacts in a database associated with the one or more serving devices;

providing, by the one or more serving devices, the data associated with the plurality of contacts to the first device; and enabling selection of a first contact of the plurality of contacts to enable the first device to send a communication to a device associated with the first contact.

2. The method of claim 1, further comprising:

receiving, by the one or more serving devices, a second indication from the first device of a modification to the data associated with the plurality of contacts;

updating, by the one or more serving devices, the database based on the modification; and sending, by the one or more serving devices, instructions to the second device to update the data associated with the plurality of contacts in a local database associated with the second device.

3. The method of claim 2, further comprising prior to updating the database:

accessing, by the one or more serving devices, a modification policy that identifies one or more related devices that are permitted to modify the data associated with the plurality of contacts; and determining, by the one or more serving devices and based at least in part on the modification policy, that the first device is permitted to modify the data associated with the plurality of contacts.

4. The method of claim 2, further comprising, prior to sending the instructions to the second device:

accessing, by the one or more serving devices, presence information, capabilities information, or both presence information and capabilities information associated with the second device; and determining, by the one or more serving devices, based at least in part on the presence information, the capabilities information, or both the presence information and the capabilities information, that the second device is online, capable of receiving the instructions, or both online and capable of receiving the instructions.

5. The method of claim 2, wherein the modification to the data associated with the plurality of contacts comprises an addition of one or more data items associated with a new contact.

6. The method of claim 2, wherein the modification to the data associated with the plurality of contacts comprises an update to one or more data items of the data associated with a second contact of the plurality of contacts.

7. The method of claim 1, wherein either:

the first device comprises a browser-enabled device and the second device comprises a cellular communication device; or the first device comprises a cellular communication device and the second device comprises a browser-enabled device.

8. The method of claim 1, wherein:

the first device and the second device are both browser-enabled devices; or the first device and the second device are both cellular communication devices.

9. A first device comprising:

a display;

a database configured to store data associated with a plurality of contacts;

one or more processors;

memory; and a plurality of programming instructions stored on the memory and executable by the one or more processors to perform operations comprising:

registering with a network to utilize a communication address for sending and receiving communications via the network, the communication address shared by a related device;

retrieving, from one or more serving devices, data associated with a plurality of contacts associated with the related device;

causing the data associated with the plurality of contacts to be stored in the database;

presenting, via the display, at least a portion of the plurality of contacts;

receiving a selection of a first contact of the plurality of contacts via a user interface; and sending a communication to a device associated with the first contact.

10. The first device of claim 9, the operations further comprising:

receiving a modification to the data associated with the plurality of contacts; and providing the modification to the one or more serving devices.

11. The first device of claim 10, wherein the modification comprises at least one of an addition of a new data item corresponding to a new contact, a deletion of a first data item of the data associated with a second contact of the plurality of contacts, or an update to a second data item of the data associated with a third contact of the plurality of contacts.

12. The first device of claim 9, the operations further comprising:

receiving, from the one or more serving devices, instructions associated with a modification to the data associated with the plurality of contacts; and updating the database to reflect the modification.

13. The first device of claim 12, the operations further comprising:

presenting a notification via the display indicating that the data associated with the plurality of contacts has been updated.

14. The first device of claim 13, wherein the notification specifies a second contact of the plurality of contacts corresponding to the modification.

15. A first device comprising:

a database storing data associated with a plurality of contacts;

one or more processors;

memory; and a plurality of programming instructions stored on the memory and executable by the one or more processors to perform operations comprising:

receiving an indication that a second device related to the first device has registered with a network, the second device being associated with a communication address associated with the first device; and providing, based at least in part on receiving the indication, the data associated with the plurality of contacts to one or more serving devices.

16. The first device of claim 15, the operations further comprising:

determining a modification policy identifying particular related devices that are permitted to modify the data associated with the plurality of contacts; and providing the modification policy to the one or more serving devices.

17. The first device of claim 16, wherein the modification policy identifies whether the first device has permission to modify the data associated with the plurality of contacts by at least one of:

adding a new data item corresponding to a new contact;

deleting one or more data items of the data associated with a first contact of the plurality of contacts; or updating one or more data items of the data associated with a second contact of the plurality of contacts.

18. The first device of claim 15, the operations further comprising:

receiving, from the one or more serving devices, instructions associated with a modification to the data associated with the plurality of contacts; and updating the database to reflect the modification.

19. The first device of claim 18, wherein the modification to the data associated with the plurality of contacts comprises deleting a first contact of the plurality of contacts in the database.

20. The first device of claim 19, further comprising a display, wherein the operations further comprise:

presenting, via the display, representations of one or more of the contacts via a user interface; and presenting a notification via the user interface indicating that the database has been updated.

* * * * *